United States Patent
Mironov et al.

(10) Patent No.: US 10,212,968 B2
(45) Date of Patent: Feb. 26, 2019

(54) SMOKING ARTICLE WITH A VALVE

(71) Applicant: Philip Morris Products S.A., Neuchatel (CH)

(72) Inventors: Oleg Mironov, Neuchatel (CH); Sebastien Lanaspeze, Vaumarcus (CH)

(73) Assignee: Philip Morris Products S.A., Neuchatel (CH)

( * ) Notice: Subject to any disclaimer, the term of this patent is extended or adjusted under 35 U.S.C. 154(b) by 323 days.

(21) Appl. No.: 15/106,878

(22) PCT Filed: Dec. 12, 2014

(86) PCT No.: PCT/EP2014/077633
§ 371 (c)(1),
(2) Date: Jun. 21, 2016

(87) PCT Pub. No.: WO2015/097005
PCT Pub. Date: Jul. 2, 2015

(65) Prior Publication Data
US 2017/0000189 A1 Jan. 5, 2017

(30) Foreign Application Priority Data
Dec. 23, 2013 (EP) .................................. 13199311

(51) Int. Cl.
*A24F 47/00* (2006.01)
*F16K 31/00* (2006.01)

(52) U.S. Cl.
CPC .......... *A24F 47/006* (2013.01); *F16K 31/002* (2013.01)

(58) Field of Classification Search
CPC .............................. A24F 47/006; F16K 31/002
See application file for complete search history.

(56) References Cited

U.S. PATENT DOCUMENTS 5,040,551 A    8/1991 Schlatter et al.
5,865,186 A *  2/1999 Volsey, II ............. A24F 47/006
                                                  131/194

(Continued)

FOREIGN PATENT DOCUMENTS

CN    86102917 A    11/1987
CN    1059841 A     4/1992

(Continued)

OTHER PUBLICATIONS

Combined Chinese Office Action and Search Report dated Jun. 5, 2018 in corresponding Patent Application No. 201480066189.2 (with English Translation), 11 pages.

(Continued)

*Primary Examiner* — Edmund H Lee
*Assistant Examiner* — Jamel M Nelson
(74) *Attorney, Agent, or Firm* — Oblon, McClelland, Maier & Neustadt, L.L.P.

(57) ABSTRACT

A smoking article is provided, including a combustible heat source having opposed front and rear faces; one or more airflow channels extending from the front face to the rear face of the combustible heat source; an aerosol-forming substrate downstream of the rear face of the combustible heat source; and a thermostatic bimetal valve located between the rear face of the combustible heat source and the aerosol-forming substrate, wherein the thermostatic bimetal valve is arranged to deform from a first position, in which the valve substantially prevents or inhibits fluid communication between the one or more airflow channels and the aerosol-forming substrate, to a second position, in which the one or more airflow channels and the aerosol-forming substrate are in fluid communication, when the thermostatic bimetal valve is heated to above a threshold temperature.

15 Claims, 10 Drawing Sheets

(56) References Cited

U.S. PATENT DOCUMENTS

| | | |
|---|---|---|
| 6,532,965 B1 | 3/2003 | Abhulimen et al. |
| 2009/0065011 A1 | 3/2009 | Maeder et al. |
| 2009/0151717 A1 | 6/2009 | Bowen et al. |
| 2010/0043809 A1 | 2/2010 | Magnon |
| 2013/0061861 A1 | 3/2013 | Hearn |

FOREIGN PATENT DOCUMENTS

| | | |
|---|---|---|
| CN | 1287700 C | 12/2006 |
| CN | 10195179 A | 1/2011 |
| CN | 102905569 A | 1/2013 |
| JP | 2005-506081 | 3/2005 |
| JP | 2008-35742 | 2/2006 |
| JP | 2009-521940 | 6/2009 |
| JP | 2010-535530 | 11/2010 |
| JP | 2012-152224 | 8/2012 |
| JP | 2013-521818 | 6/2013 |
| RU | 2 465 791 C1 | 11/2012 |
| UA | 88052 C2 | 9/2009 |
| UA | 78167 U | 3/2013 |
| WO | WO 2009/015888 A1 | 2/2009 |
| WO | WO 2009/022232 A2 | 2/2009 |
| WO | WO 2009/074870 A2 | 6/2009 |
| WO | WO 2011/117580 A2 | 9/2011 |
| WO | WO 2012/164033 A1 | 12/2012 |
| WO | WO 2012/164077 A1 | 12/2012 |
| WO | WO 2013/034456 A1 | 3/2013 |
| WO | WO 2013/083638 A1 | 6/2013 |
| WO | WO 2013/120855 A1 | 8/2013 |

OTHER PUBLICATIONS

Decision to Grant dated Jun. 29, 2018 in corresponding Russian Patent Application No. 2016130062 (with English Translation), 14 pages.

Search Report dated Jun. 29, 2018 in corresponding Russian Patent Application No. 2016130062 (with English Translation), 5 pages.

Office Action dated Aug. 7, 2018 in Australian Patent Application No. 2014372841, 4 pages.

International Search Report and Written Opinion of the International Searching Authority dated Mar. 25, 2015, in PCT/EP2014/077633.

Decision of Grant with English translation dated Oct. 18, 2018, in corresponding Japanese Patent Application No. 2016-535030, (6 pages).

Notice of Allowance with English translation dated Oct. 29, 2018, in corresponding Ukrainian Patent Application No. 2016 06993, (12 pages).

* cited by examiner

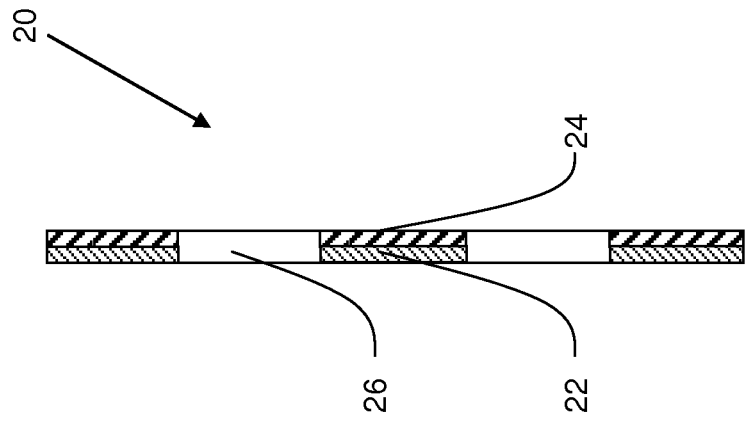
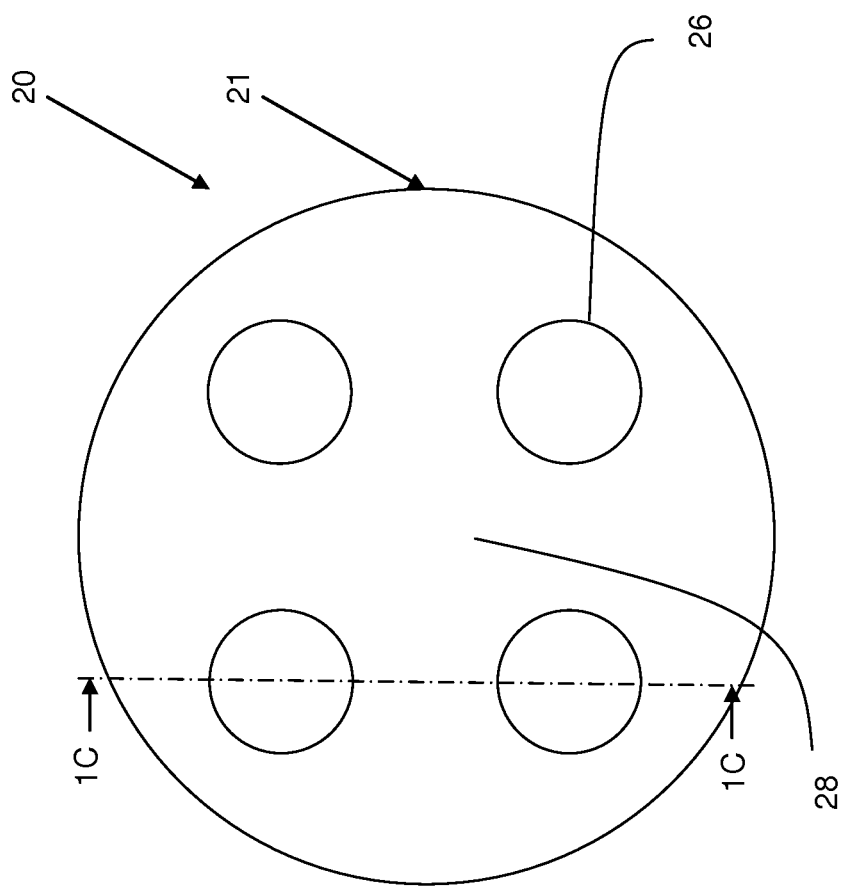

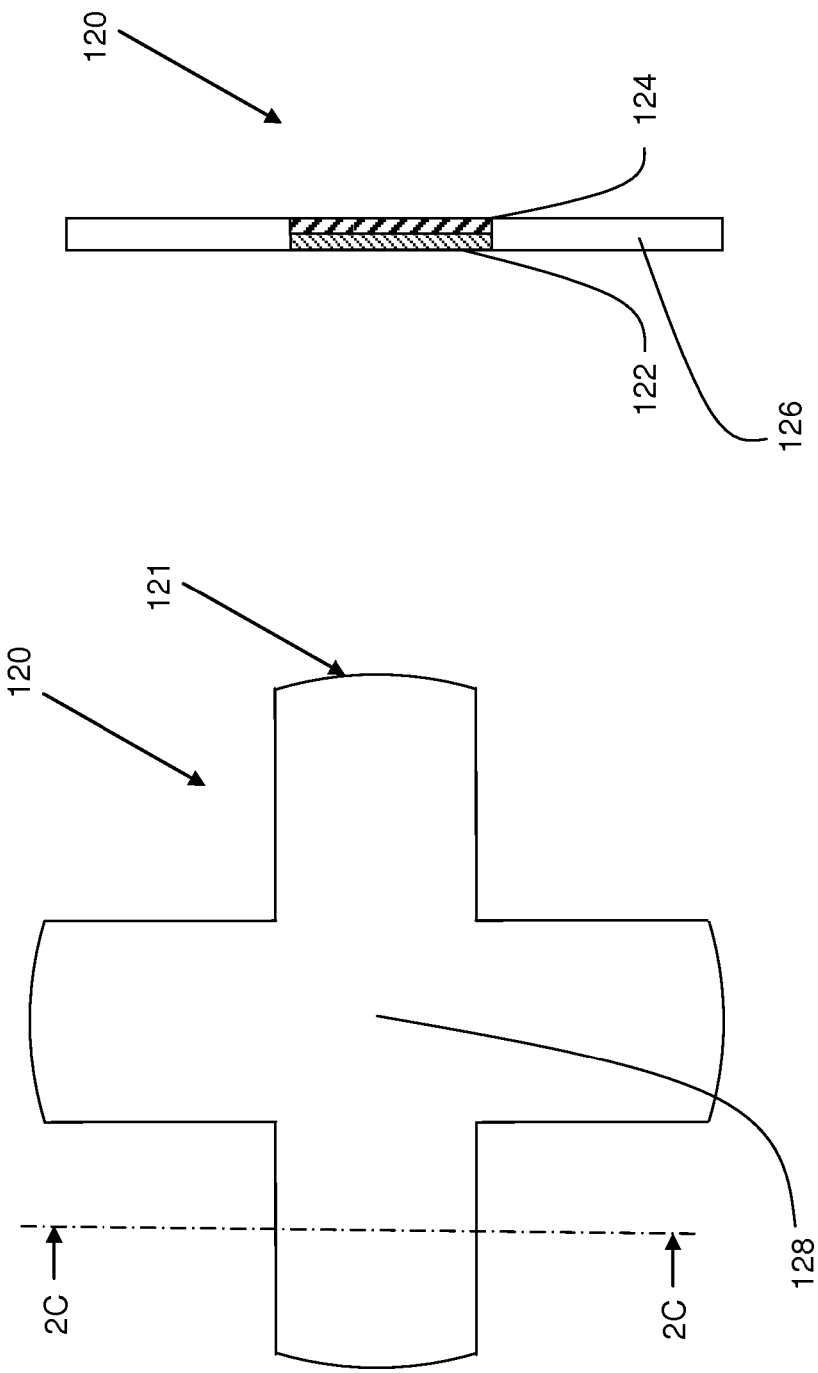

SMOKING ARTICLE WITH A VALVE

The present invention relates to a smoking article comprising a combustible heat source having opposed front and rear faces, one or more airflow channels extending from the front face to the rear face of the combustible heat source, an aerosol-forming substrate downstream of the rear face and a thermostatic bimetal valve between the rear face of the combustible heat source and the aerosol-forming substrate.

A number of smoking articles in which tobacco is heated rather than combusted have been proposed in the art. One aim of such 'heated' smoking articles is to reduce known harmful smoke constituents of the type produced by the combustion and pyrolytic degradation of tobacco in conventional cigarettes. In one known type of heated smoking article, an aerosol is generated by the transfer of heat from a combustible heat source to a physically separate aerosol-forming substrate. The aerosol-forming substrate may be located within, around or downstream of the combustible heat source. During smoking, volatile compounds are released from the aerosol-forming substrate by heat transfer from the combustible heat source and entrained in air drawn through the smoking article. As the released compounds cool, they condense to form an aerosol that is inhaled by the user. Typically, air is drawn into such known heated smoking articles through one or more airflow channels provided through the combustible heat source and heat transfer from the combustible heat source to the aerosol-forming substrate occurs by forced convection and conduction.

For example, WO-A2-2009/022232 discloses a smoking article comprising a combustible heat source, an aerosol-forming substrate downstream of the combustible heat source, and a heat-conducting element around and in direct contact with a rear portion of the combustible heat source and an adjacent front portion of the aerosol-forming substrate. To provide a controlled amount of forced convective heating of the aerosol-forming substrate, one or more longitudinal airflow channels are provided through the combustible heat source.

In known heated smoking articles comprising one or more airflow channels through the combustible heat source, puffing by the user while lighting the combustible heat source may lead to the user being exposed to undesirable pyrolytic and combustion by-products, or decomposition and reaction products, for example due to combustion of the aerosol-forming substrate, soot from the flame used to ignite the combustible heat source, or emissions from the combustible heat source.

There remains a need for heated smoking articles comprising a combustible heat source with opposed front and rear faces, one or more airflow channels extending from the front face to the rear face of the combustible heat source, and an aerosol-forming substrate downstream of the rear face of the combustible heat source in which the exposure of the user to undesirable compounds during ignition of the heat source is reduced. In particular, there remains a need for heated smoking articles comprising a combustible heat source with opposed front and rear faces, one or more airflow channels extending from the front face to the rear face of the combustible heat source, and an aerosol-forming substrate downstream of the rear face of the combustible heat source in which air is substantially prevented from being drawn through the one or more airflow channels until the combustible heat source is fully ignited.

According to the invention, there is provided a smoking article comprising a combustible heat source having opposed front and rear faces, one or more airflow channels extending from the front face to the rear face of the combustible heat source, an aerosol-forming substrate downstream of the rear face of the combustible heat source, and a thermostatic bimetal valve located between the rear face of the combustible heat source and the aerosol-forming substrate, wherein the thermostatic bimetal valve is arranged to deform from a first position, in which the valve substantially prevents or inhibits fluid communication between the one or more airflow channels and the aerosol-forming substrate, to a second position, in which the one or more airflow channels and the aerosol-forming substrate are in fluid communication, when the thermostatic bimetal valve is heated to above a threshold temperature. That is, the thermostatic bimetal valve is heated with sufficient energy to reach the threshold temperature.

In certain embodiments, the valve substantially prevents fluid communication between the one or more airflow channels and the aerosol-forming substrate when in the first position.

As used herein, the terms 'distal', 'upstream' and 'front', and 'proximal', 'downstream' and 'rear', are used to describe the relative positions of components, or portions of components, of the smoking article in relation to the direction in which a user draws on the smoking article during use thereof. Smoking articles according to the invention comprise a proximal end through which, in use, an aerosol exits the smoking article for delivery to a user. The proximal end of the smoking article may also be referred to as the mouth end. In use, a user draws on the proximal end of the smoking article in order to inhale an aerosol generated by the smoking article.

The combustible heat source is located at or proximate to the distal end. The mouth end is downstream of the distal end. The proximal end may also be referred to as the downstream end of the smoking article and the distal end may also be referred to as upstream end of the smoking article. Components, or portions of components, of smoking articles according to the invention may be described as being upstream or downstream of one another based on their relative positions between the proximal end and the distal end of the smoking article.

The front face of the combustible heat source is at the upstream end of the combustible heat source. The upstream end of the combustible heat source is the end of the combustible heat source furthest from the proximal end of the smoking article. The rear face of the combustible heat source is at the downstream end of the combustible heat source. The downstream end of the combustible heat source is the end of the combustible heat source closest to the proximal end of the smoking article.

As used herein, the term 'length' is used to describe the maximum dimension in the longitudinal direction of the smoking article. That is, the maximum dimension in the direction between the proximal end and the opposed distal end of the smoking article.

As used herein, the term 'airflow channel' is used to describe a channel extending along the length of a combustible heat source through which air may be drawn downstream for inhalation by a user.

As used herein, the term 'aerosol-forming substrate' is used to describe a substrate capable of releasing upon heating volatile compounds, which can form an aerosol. The aerosols generated from aerosol-forming substrates of smoking articles according to the invention may be visible or invisible and may include vapours (for example, fine particles of substances, which are in a gaseous state, that are ordinarily liquid or solid at room temperature) as well as gases and liquid droplets of condensed vapours.

The aerosol-forming substrate may be in the form of a plug or segment comprising a material capable of releasing upon heating volatile compounds, which can form an aerosol, circumscribed by a wrapper. Where an aerosol-forming substrate is in the form of such a plug or segment, the entire plug or segment including any wrapper is considered to be the aerosol-forming substrate.

As used herein, the term 'thermostatic' is used to describe an object which automatically responds to changes in temperature.

As used herein, the term 'bimetal' is used to describe an object which is formed from the bonding together of two layers of metals and/or alloys with differing thermal expansion coefficients.

As used herein, the term 'valve' is used to describe a device which controls the airflow through the article. This includes, but is not limited to, a one-way valve.

As used herein, the term 'deform' is used to describe the change of shape and/or dimensions of an object, either elastically or plastically.

Smoking articles according to the invention comprise a combustible heat source including one or more airflow channels.

The one or more airflow channels may comprise one or more enclosed airflow channels.

As used herein, the term 'enclosed' is used to describe airflow channels that extend through the interior of the combustible heat source and are surrounded by the combustible heat source.

Alternatively or in addition, the one or more airflow channels may comprise one or more non-enclosed airflow channels. For example, the one or more airflow pathways may comprise one or more grooves or other non-enclosed airflow channels that extend along the exterior of the combustible heat source.

The one or more airflow channels may comprise one or more enclosed airflow channels or one or more non-enclosed airflow channels or a combination thereof.

In certain embodiments, smoking articles according to the invention comprise one, two or three airflow channels extending from the front face to the rear face of the combustible heat source.

In preferred embodiments, smoking articles according to the invention comprise a single airflow channel extending from the front face to the rear face of the combustible heat source.

In particularly preferred embodiments, smoking articles according to the invention comprise a single substantially central or axial airflow channel extending from the front face to the rear face of the combustible heat source.

In such embodiments, the diameter of the single airflow channel is preferably between about 1.5 mm and about 3 mm.

It will be appreciated that in addition to one or more airflow channels through which air may be drawn for inhalation by a user, combustible heat sources of smoking articles according to the invention may also comprise one or more closed or blocked passageways through which air may not be drawn for inhalation by a user.

For example, smoking articles according to the invention may comprise combustible heat sources comprising one or more airflow channels extending from the front face to the rear face of the combustible heat source and one or more closed passageways that extend from the front face of the combustible heat source only part way along the length combustible heat source.

The inclusion of one or more closed air passageways increases the surface area of the combustible heat source that is exposed to oxygen from the air and may advantageously facilitate ignition and sustained combustion of the combustible heat source.

In use, air drawn through the aerosol-forming substrate of the smoking article enters the smoking article through the one or more airflow channels. The drawn air passes downstream through the smoking article and exits the smoking article through the proximal end thereof.

In certain embodiments, the air drawn through the aerosol-forming substrate of the smoking article that enters the smoking article through the one or more airflow channels may come into direct contact with a combustible portion of the combustible heat source as it passes through the one or more airflow channels.

Alternatively or in addition, the air drawn through the aerosol-forming substrate of the smoking article that enters the smoking article through the one or more airflow channels may come into direct contact with the rear face of the combustible heat source.

Smoking articles according to the invention may further comprise a non-combustible substantially air impermeable first barrier between the rear face of the combustible heat source and the aerosol-forming substrate.

As used herein, the term 'non-combustible' is used to describe a barrier that is substantially non-combustible at temperatures reached by the combustible heat source during combustion and ignition thereof.

The first barrier may abut the rear face of the combustible heat source. Alternatively, the first barrier may be spaced apart from the rear face of the combustible heat source.

As used herein, the term 'abut' is used to indicate direct contact between adjacent components.

The first barrier may be adhered or otherwise affixed to the rear face of the combustible heat source.

In certain preferred embodiments, the first barrier comprises a non-combustible substantially air impermeable first barrier coating provided on the rear face of the combustible heat source. In such embodiments, preferably the first barrier comprises a first barrier coating provided on at least substantially the entire rear face of the combustible heat source.

As used herein, the term 'coating' is used to describe a layer of material that covers and is adhered to the combustible heat source.

The first barrier may advantageously limit the temperature to which the aerosol-forming substrate is exposed during ignition and combustion of the combustible heat source, and so help to avoid or reduce thermal degradation or combustion of the aerosol-forming substrate during use of the smoking article. This is particularly advantageous where the combustible heat source comprises one or more additives to aid ignition of the combustible heat source.

Inclusion of a non-combustible substantially air impermeable first barrier between the rear face of the combustible heat source and the aerosol-forming substrate may also advantageously substantially prevent or inhibit migration of components of the aerosol-forming substrate of smoking articles according to the invention to the combustible heat source during storage of the smoking articles.

Alternatively or in addition, inclusion of a non-combustible substantially air impermeable first barrier between the rear face of the combustible heat source and the aerosol-forming substrate may advantageously substantially prevent or inhibit migration of components of the aerosol-forming substrate of smoking articles according to the invention to the combustible heat source during use of the smoking articles.

Inclusion of a non-combustible substantially air impermeable first barrier between the rear face of the combustible heat source and the aerosol-forming substrate may be particularly advantageous where the aerosol-forming substrate comprises at least one aerosol-former.

In such embodiments, inclusion of a non-combustible substantially air impermeable first barrier between the rear face of the combustible heat source and the aerosol-forming substrate may advantageously prevent or inhibit migration of the at least one aerosol-former from the aerosol-forming substrate to the combustible heat source during storage and use of the smoking article. Decomposition of the at least one aerosol-former during use of the smoking articles may thus be advantageously substantially avoided or reduced.

Depending upon the desired characteristics and performance of the smoking article, the first barrier may have a low thermal conductivity or a high thermal conductivity. In certain embodiments, the first barrier may be formed from material having a bulk thermal conductivity of between about 0.1 W per meter Kelvin (W/(m·K)) and about 200 W per meter Kelvin (W/(m·K)), at 23° C. and a relative humidity of 50% as measured using the modified transient plane source (MTPS) method.

The thickness of the first barrier may be appropriately adjusted to achieve good smoking performance. In certain embodiments, the first barrier may have a thickness of between about 10 microns and about 500 microns.

The first barrier may be formed from one or more suitable materials that are substantially thermally stable and non-combustible at temperatures achieved by the combustible heat source during ignition and combustion. Suitable materials are known in the art and include, but are not limited to, clays (such as, for example, bentonite and kaolinite), glasses, minerals, ceramic materials, resins, metals and combinations thereof.

Preferred materials from which the first barrier may be formed include clays and glasses. More preferred materials from which the first barrier may be formed include copper, aluminium, stainless steel, alloys, alumina ($Al_2O_3$), resins, and mineral glues.

In certain preferred embodiments, the first barrier comprises a clay coating comprising a 50/50 mixture of bentonite and kaolinite provided on the rear face of the combustible heat source. In other preferred embodiments, the first barrier comprises a glass coating, more preferably a sintered glass coating, provided on the rear face of the combustible heat source.

In certain particularly preferred embodiments, the first barrier comprises an aluminium coating provided on the rear face of the combustible heat source.

Preferably, the first barrier has a thickness of at least about 10 microns.

Due to the slight permeability of clays to air, in embodiments where the first barrier comprises a clay coating provided on the rear face of the combustible heat source, the clay coating more preferably has a thickness of at least about 50 microns, and most preferably of between about 50 microns and about 350 microns.

In embodiments where the first barrier is formed from one or more materials that are more impervious to air, such as aluminium, the first barrier may be thinner, and generally will preferably have a thickness of less than about 100 microns, and more preferably of about 20 microns.

In embodiments where the first barrier comprises a glass coating provided on the rear face of the combustible heat source, the glass coating preferably has a thickness of less than about 200 microns.

The thickness of the first barrier may be measured using a microscope, a scanning electron microscope (SEM) or any other suitable measurement methods known in the art.

Where the first barrier comprises a first barrier coating provided on the rear face of the combustible heat source, the first barrier coating may be applied to cover and adhere to the rear face of the combustible heat source by any suitable methods known in the art including, but not limited to, spray-coating, vapour deposition, dipping, material transfer (for example, brushing or gluing), electrostatic deposition or any combination thereof.

For example, the first barrier coating may be made by pre-forming a barrier in the approximate size and shape of the rear face of the combustible heat source, and applying it to the rear face of the combustible heat source to cover and adhere to at least substantially the entire rear face of the combustible heat source. Alternatively, the first barrier coating may be cut or otherwise machined after it is applied to the rear face of the combustible heat source. In one preferred embodiment, aluminium foil is applied to the rear face of the combustible heat source by gluing or pressing it to the combustible heat source, and is cut or otherwise machined so that the aluminium foil covers and adheres to at least substantially the entire rear face of the combustible heat source.

In another preferred embodiment, the first barrier coating is formed by applying a solution or suspension of one or more suitable coating materials to the rear face of the combustible heat source. For example, the first barrier coating may be applied to the rear face of the combustible heat source by dipping the rear face of the combustible heat source in a solution or suspension of one or more suitable coating materials or by brushing or spray-coating a solution or suspension or electrostatically depositing a powder or powder mixture of one or more suitable coating materials onto the rear face of the combustible heat source. Where the first barrier coating is applied to the rear face of the combustible heat source by electrostatically depositing a powder or powder mixture of one or more suitable coating materials onto the rear face of the combustible heat source, the rear face of the combustible heat source is preferably pre-treated with water glass before electrostatic deposition. Preferably, the first barrier coating is applied by spray-coating.

The first barrier coating may be formed through a single application of a solution or suspension of one or more suitable coating materials to the rear face of the combustible heat source. Alternatively, the first barrier coating may be formed through multiple applications of a solution or suspension of one or more suitable coating materials to the rear face of the combustible heat source. For example, the first barrier coating may be formed through one, two, three, four, five, six, seven or eight successive applications of a solution or suspension of one or more suitable coating materials to the rear face of the combustible heat source.

Preferably, the first barrier coating is formed through between one and ten applications of a solution or suspension of one or more suitable coating materials to the rear face of the combustible heat source.

After application of the solution or suspension of one or more coating materials to the rear face thereof, the combustible heat source may be dried to form the first barrier coating.

Where the first barrier coating is formed through multiple applications of a solution or suspension of one or more suitable coating materials to the rear face thereof, the combustible heat source may need to be dried between successive applications of the solution or suspension.

Alternatively or in addition to drying, after application of a solution or suspension of one or more coating materials to the rear face of the combustible heat source, the coating material on the combustible heat source may be sintered in order to form the first barrier coating. Sintering of the first barrier coating is particularly preferred where the first barrier coating is a glass or ceramic coating. Preferably, the first barrier coating is sintered at a temperature of between about 500° C. and about 900° C., and more preferably at about 700° C.

Alternatively or in addition to a non-combustible, substantially air impermeable first barrier between the rear face of the combustible heat source and the aerosol-forming substrate, smoking articles according to the invention comprising a combustible heat source may comprise a non-combustible substantially air impermeable second barrier between the combustible heat source and the one or more airflow channels.

The second barrier may advantageously substantially prevent or inhibit combustion and decomposition products formed during ignition and combustion of the combustible heat source from entering air drawn into smoking articles according to the invention through the one or more airflow channels as the drawn air passes through the one or more airflow channels. This is particularly advantageous where the combustible heat source comprises one or more additives to aid ignition or combustion of the combustible heat source.

Inclusion of a non-combustible substantially air impermeable second barrier between the combustible heat source and the one or more airflow channels may also advantageously substantially prevent or inhibit activation of combustion of the combustible heat source during puffing by a user. This may substantially prevent or inhibit spikes in the temperature of the aerosol-forming substrate during puffing by a user.

By preventing or inhibiting activation of combustion of the combustible heat source, and so preventing or inhibiting excess temperature increases in the aerosol-forming substrate, combustion or pyrolysis of the aerosol-forming substrate under intense puffing regimes may be advantageously avoided. In addition, the impact of a user's puffing regime on the composition of the mainstream aerosol may be advantageously minimised or reduced.

The second barrier may be adhered or otherwise affixed to the combustible heat source.

In certain preferred embodiments, the second barrier comprises a non-combustible substantially air impermeable second barrier coating provided on an inner surface of the one or more airflow channels. In such embodiments, preferably the second barrier comprises a second barrier coating provided on at least substantially the entire inner surface of the one or more airflow channels. More preferably, the second barrier comprises a second barrier coating provided on the entire inner surface of the one or more airflow channels.

In other embodiments, the second barrier coating may be provided by insertion of a liner into the one or more airflow channels. For example, where the one or more airflow channels comprise one or more enclosed airflow channels that extend through the interior of the combustible heat source, a non-combustible substantially air impermeable hollow tube may be inserted into each of the one or more airflow channels.

Depending upon the desired characteristics and performance of the smoking article, the second barrier may have a low thermal conductivity or a high thermal conductivity. Preferably, the second barrier has a low thermal conductivity.

The thickness of the second barrier may be appropriately adjusted to achieve good smoking performance. In certain embodiments, the second barrier may have a thickness of between about 30 microns and about 200 microns. In a preferred embodiment, the second barrier has a thickness of between about 30 microns and about 100 microns.

The second barrier may be formed from one or more suitable materials that are substantially thermally stable and non-combustible at temperatures achieved by the combustible heat source during ignition and combustion. Suitable materials are known in the art and include, but are not limited to, for example: clays; metal oxides, such as iron oxide, alumina, titania, silica, silica-alumina, zirconia and ceria; zeolites; zirconium phosphate; and other ceramic materials or combinations thereof.

Preferred materials from which the second barrier may be formed include clays, glasses, aluminium, iron oxide and combinations thereof. If desired, catalytic ingredients, such as ingredients that promote the oxidation of carbon monoxide to carbon dioxide, may be incorporated in the second barrier. Suitable catalytic ingredients include, but are not limited to, for example, platinum, palladium, transition metals and their oxides.

Where the second barrier comprises a second barrier coating provided on an inner surface of the one or more airflow channels, the second barrier coating may be applied to the inner surface of the one or more airflow channels by any suitable method, such as the methods described in U.S. Pat. No. 5,040,551. For example, the inner surface of the one or more airflow channels may be sprayed, wetted or painted with a solution or a suspension of the second barrier coating. In certain preferred embodiments, the second barrier coating is applied to the inner surface of the one or more airflow channels by the process described in WO-A2-2009/074870 as the combustible heat source is extruded.

Preferably, the combustible heat source is a carbonaceous heat source. As used herein, the term 'carbonaceous' is used to describe a combustible heat source comprising carbon. Preferably, combustible carbonaceous heat sources for use in smoking articles according to the invention have a carbon content of at least about 35 percent, more preferably of at least about 40 percent, most preferably of at least about 45 percent by dry weight of the combustible heat source.

In some embodiments, combustible heat sources according to the invention are combustible carbon-based heat sources. As used herein, the term 'carbon-based heat source' is used to describe a heat source comprised primarily of carbon.

Combustible carbon-based heat sources for use in smoking articles according to the invention have a carbon content of at least about 50 percent. For example, combustible carbon-based heat sources for use in smoking articles according to the invention may have a carbon content of at least about 60 percent, or at least about 70 percent, or at least about 80 percent by dry weight of the combustible carbon-based heat source.

Smoking articles according to the invention may comprise combustible carbonaceous heat sources formed from one or more suitable carbon-containing materials.

If desired, one or more binders may be combined with the one or more carbon-containing materials. Preferably, the one or more binders are organic binders. Suitable known organic binders, include but are not limited to, gums (for example, guar gum), modified celluloses and cellulose derivatives (for example, methyl cellulose, carboxymethyl cellulose, hydroxypropyl cellulose and hydroxypropyl methylcellulose) flour, starches, sugars, vegetable oils and combinations thereof.

In one preferred embodiment, the combustible heat source is formed from a mixture of carbon powder, modified cellulose, flour and sugar.

Instead of, or in addition to one or more binders, combustible heat sources for use in smoking articles according to the invention may comprise one or more additives in order to improve the properties of the combustible heat source. Suitable additives include, but are not limited to, additives to promote consolidation of the combustible heat source (for example, sintering aids), additives to promote ignition of the combustible heat source (for example, oxidisers such as perchlorates, chlorates, nitrates, peroxides, permanganates, zirconium and combinations thereof), additives to promote combustion of the combustible heat source (for example, potassium and potassium salts, such as potassium citrate) and additives to promote decomposition of one or more gases produced by combustion of the combustible heat source (for example catalysts, such as CuO, $Fe_2O_3$ and $Al_2O_3$).

Where smoking articles according to the invention comprise a first barrier coating provided on the rear face of the combustible heat source, such additives may be incorporated in the combustible heat source prior to or after application of the first barrier coating to the rear face of the combustible heat source.

In certain preferred embodiments, the combustible heat source is a combustible carbonaceous heat source comprising carbon and at least one ignition aid. In one preferred embodiment, the combustible heat source is a combustible carbonaceous heat source comprising carbon and at least one ignition aid as described in WO-A1-2012/164077.

As used herein, the term 'ignition aid' is used to denote a material that releases one or both of energy and oxygen during ignition of the combustible heat source, where the rate of release of one or both of energy and oxygen by the material is not ambient oxygen diffusion limited. In other words, the rate of release of one or both of energy and oxygen by the material during ignition of the combustible heat source is largely independent of the rate at which ambient oxygen can reach the material. As used herein, the term 'ignition aid' is also used to denote an elemental metal that releases energy during ignition of the combustible heat source, wherein the ignition temperature of the elemental metal is below about 500° C. and the heat of combustion of the elemental metal is at least about 5 kJ/g.

As used herein, the term 'ignition aid' does not include alkali metal salts of carboxylic acids (such as alkali metal citrate salts, alkali metal acetate salts and alkali metal succinate salts), alkali metal halide salts (such as alkali metal chloride salts), alkali metal carbonate salts or alkali metal phosphate salts, which are believed to modify carbon combustion. Even when present in a large amount relative to the total weight of the combustible heat source, such alkali metal burn salts do not release enough energy during ignition of a combustible heat source to produce an acceptable aerosol during early puffs.

Examples of suitable oxidizing agents include, but are not limited to: nitrates such as, for example, potassium nitrate, calcium nitrate, strontium nitrate, sodium nitrate, barium nitrate, lithium nitrate, aluminium nitrate and iron nitrate; nitrites; other organic and inorganic nitro compounds; chlorates such as, for example, sodium chlorate and potassium chlorate; perchlorates such as, for example, sodium perchlorate; chlorites; bromates such as, for example, sodium bromate and potassium bromate; perbromates; bromites; borates such as, for example, sodium borate and potassium borate; ferrates such as, for example, barium ferrate; ferrites; manganates such as, for example, potassium manganate; permanganates such as, for example, potassium permanganate; organic peroxides such as, for example, benzoyl peroxide and acetone peroxide; inorganic peroxides such as, for example, hydrogen peroxide, strontium peroxide, magnesium peroxide, calcium peroxide, barium peroxide, zinc peroxide and lithium peroxide; superoxides such as, for example, potassium superoxide and sodium superoxide; iodates; periodates; iodites; sulphates; sulfites; other sulfoxides; phosphates; phospinates; phosphites; and phosphanites.

While advantageously improving the ignition and combustion properties of the combustible heat source, the inclusion of ignition and combustion additives can give rise to undesirable decomposition and reaction products during use of the smoking article. For example, decomposition of nitrates included in the combustible heat source to aid ignition thereof can result in the formation of nitrogen oxides.

The inclusion of a non-combustible substantially air impermeable second barrier between the one or more airflow channels and the combustible heat source of smoking articles according to the invention may advantageously substantially prevent or inhibit such decomposition and reaction products from entering air drawn into smoking articles according to the invention through the one or more airflow channels as the drawn air passes through the one or more airflow channels.

Combustible carbonaceous heat sources for use in smoking articles according to the invention may be prepared as described in prior art that is known to persons of ordinary skill in the art.

Combustible carbonaceous heat sources for use in smoking articles according to the invention, are preferably formed by mixing one or more carbon-containing materials with one or more binders and other additives, where included, and pre-forming the mixture into a desired shape. The mixture of one or more carbon containing materials, one or more binders and optional other additives may be pre-formed into a desired shape using any suitable known ceramic forming methods such as, for example, slip casting, extrusion, injection moulding and die compaction or pressing. In certain preferred embodiments, the mixture is pre-formed into a desired shape by pressing or extrusion or a combination thereof.

Preferably, the mixture of one or more carbon-containing materials, one or more binders and other additives is pre-formed into an elongate rod. However, it will be appreciated that the mixture of one or more carbon-containing materials, one or more binders and other additives may be pre-formed into other desired shapes.

After formation, particularly after extrusion, the elongate rod or other desired shape is preferably dried to reduce its moisture content and then pyrolysed in a non-oxidizing atmosphere at a temperature sufficient to carbonise the one or more binders, where present, and substantially eliminate any volatiles in the elongate rod or other shape. The elongate rod or other desired shape is pyrolysed preferably in a nitrogen atmosphere at a temperature of between about 700° C. and about 900° C.

In certain embodiments, at least one metal nitrate salt is incorporated in the combustible heat source by including at least one metal nitrate precursor in the mixture of one or more carbon containing materials, one or more binders and other additives. The at least one metal nitrate precursor is then subsequently converted in-situ into at least one metal nitrate salt by treating the pyrolysed pre-formed cylindrical rod or other shape with an aqueous solution of nitric acid. In one embodiment, the combustible heat source comprises at least one metal nitrate salt having a thermal decomposition temperature of less than about 600° C., more preferably of less than about 400° C. Preferably, the at least one metal nitrate salt has a decomposition temperature of between about 150° C. and about 600° C., more preferably of between about 200° C. and about 400° C.

In preferred embodiments, exposure of the combustible heat source to a conventional yellow flame lighter or other ignition means should cause the at least one metal nitrate salt to decompose and release oxygen and energy. This decomposition causes an initial boost in the temperature of the combustible heat source and also aids in the ignition of the combustible heat source. After decomposition of the at least one metal nitrate salt, the combustible heat source preferably continues to combust at a lower temperature.

The inclusion of at least one metal nitrate salt advantageously results in ignition of the combustible heat source being initiated internally, and not only at a point on the surface thereof. Preferably, the at least one metal nitrate salt is present in the combustible heat source in an amount of between about 20 percent by dry weight and about 50 percent by dry weight of the combustible heat source.

In other embodiments, the combustible heat source comprises at least one peroxide or superoxide that actively evolves oxygen at a temperature of less than about 600° C., more preferably at a temperature of less than about 400° C.

Preferably, the at least one peroxide or superoxide actively evolves oxygen at a temperature of between about 150° C. and about 600° C., more preferably at a temperature of between about 200° C. and about 400° C., most preferably at a temperature of about 350° C.

In use, exposure of the combustible heat source to a conventional yellow flame lighter or other ignition means should cause the at least one peroxide or superoxide to decompose and release oxygen. This causes an initial boost in the temperature of the combustible heat source and also aids in the ignition of the combustible heat source. After decomposition of the at least one peroxide or superoxide, the combustible heat source preferably continues to combust at a lower temperature.

The inclusion of at least one peroxide or superoxide advantageously results in ignition of the combustible heat source being initiated internally, and not only at a point on the surface thereof.

The combustible heat source preferably has a porosity of between about 20 percent and about 80 percent, more preferably of between about 20 percent and 60 percent. Where the combustible heat source comprises at least one metal nitrate salt, this advantageously allows oxygen to diffuse into the mass of the combustible heat source at a rate sufficient to sustain combustion as the at least one metal nitrate salt decomposes and combustion proceeds. Even more preferably, the combustible heat source has a porosity of between about 50 percent and about 70 percent, more preferably of between about 50 percent and about 60 percent as measured by, for example, mercury porosimetry or helium pycnometry. The required porosity may be readily achieved during production of the combustible heat source using conventional methods and technology.

Advantageously, combustible carbonaceous heat sources for use in smoking articles according to the invention have an apparent density of between about 0.6 g/cm$^3$ and about 1 g/cm$^3$.

Preferably, the combustible heat source has a mass of between about 300 mg and about 500 mg, more preferably of between about 400 mg and about 450 mg.

Preferably, the combustible heat source has a length of between about 7 mm and about 17 mm, more preferably of between about 7 mm and about 15 mm, most preferably of between about 7 mm and about 13 mm.

Preferably, the combustible heat source has a diameter of between about 5 mm and about 9 mm, more preferably of between about 7 mm and about 8 mm.

Preferably, the combustible heat source is of substantially uniform diameter. However, the combustible heat source may alternatively be tapered so that the diameter of a rear portion of the combustible heat source is greater than the diameter of a front portion thereof. Particularly preferred are combustible heat sources that are substantially cylindrical. The combustible heat source may, for example, be a cylinder or tapered cylinder of substantially circular cross-section or a cylinder or tapered cylinder of substantially elliptical cross-section.

Smoking articles according to the invention comprise a thermostatic bimetal valve located between the rear face of the combustible heat source and the aerosol-forming substrate. The thermostatic bimetal valve is arranged to deform from a first position, in which the valve substantially prevents or inhibits fluid communication between the one or more airflow channels and the aerosol-forming substrate, to a second position, in which the one or more airflow channels and the aerosol-forming substrate are in fluid communication, when the thermostatic bimetal valve is heated to above a threshold temperature.

By substantially preventing or inhibiting fluid communication between the aerosol-forming substrate and the one or more airflow channels when in the first position, the thermostatic multi-metal valve advantageously substantially prevents or inhibits the flow of gas and/or unwanted materials to the aerosol-forming substrate and to the user while the heat source is being lit. This prevents the user from exposure to potential disadvantages associated with puffing during ignition of the heat source.

Once the temperature of the valve reaches the threshold temperature, the valve automatically deforms to the second position in which it allows fluid communication between the aerosol-forming substrate and the one or more airflow channels. The threshold temperature is preselected based on the temperature profile of the heat source. Preferably, the threshold temperature is selected such that the valve does not open before the heat source is fully ignited. More preferably, the valve does not open until the aerosol-forming substrate has been heated by the heat source to a temperature which is sufficient to generate a sensorially acceptable aerosol. Preferably, the valve remains closed for between 2 and 30 seconds from the start of ignition of the heat source by the user. Preferably, the valve opens within 20 seconds, more preferably within 10 seconds and most preferably within 3 seconds from the start of ignition of the heat source by the user.

As used herein, the term 'fully ignited' is used to mean that the heat source is able to maintain self-sustained combustion.

The valve may also return to the first position when the smoking article cools. In one preferred embodiment, the valve closes when the temperature at the downstream end of the heat source decreases to below 300° C. In an alternative preferred embodiment, the valve closes when the temperature at the downstream end of heat source decreases to below 250° C. In a further alternative preferred embodiment, the valve closes when the temperature at the downstream end of heat source decreases to below 200° C.

The thermostatic bimetal valve may be pre-stressed such that it deforms from the first position to the second position with a snap action. In such embodiments, the valve instantaneously opens to allow the user to draw air through the smoking article without experiencing any period of increased resistance to draw which may occur if the valve were to open gradually. Alternatively, the thermostatic bimetal valve is not pre-stressed. In such embodiments, the valve gradually deforms in a substantially linear manner from the first position as the temperature of the valve increases.

In certain embodiments, the thermostatic bimetal valve is pre-stressed by pre-forming with a curvature of from 100 to 500 microns, for example by stamping. Preferably, the curvature is about 300 microns.

As used herein, the term 'curvature' is defined as the axial distance from the centre of the valve to the plane of the outer edge of the valve. In other words, the term describes the amount by which the centre of the valve is deflected in the axial direction.

In such embodiments, preferably the rear face of the combustible heat source is formed with a corresponding curvature and the thermostatic bimetal valve abuts the rear face of the heat source. Advantageously, this reduces the risk of leakage of air from the one or more airflow channels past the thermostatic bimetal valve.

In certain embodiments, the diameter of the thermostatic bimetal valve is about the same as the internal diameter of the smoking article. Preferably the diameter of the thermostatic bimetal valve is about the same as the diameter of the heat source and the aerosol forming substrate.

In certain preferred embodiments, the thermostatic bimetal valve may comprise a first thermostatic bimetal sheet with one or more solid portions and one or more openings for allowing fluid communication between the aerosol-forming substrate and at least one of the one or more airflow channels.

In such embodiments, the one or more solid portions of the first thermostatic bimetal sheet may be arranged to block all of the one or more airflow channels when the thermostatic bimetal valve is in the first position and to unblock at least one of the one or more airflow channels when the thermostatic bimetal valve is in the second position.

Where the combustible heat source has a single, central airflow channel, the first thermostatic bimetal sheet may have one or more openings which are off-centre and has a solid central portion. For example, the first thermostatic bimetal sheet may have one or more peripheral openings and a solid central portion. Preferably, the solid central portion is at least 25% larger than the diameter of the airflow channel. Preferably, the one or more peripheral openings comprise four to six holes of 0.4 to 0.8 mm diameter. Alternatively, or additionally, the first thermostatic bimetal sheet may have one or more cut-out segments and/or one or more slits which are closed when the thermostatic bimetal valve is in the first position and which are open when the thermostatic bimetal valve is in the second position.

As used herein, the term "off-centre" is used to mean that the openings are situated outside of the solid central portion.

In certain preferred embodiments, the first thermostatic bimetal sheet is a substantially circular thermostatic bimetal disk having a diameter of between about 5 mm and about 15 mm, more preferably between about 7 mm and about 9 mm, and most preferably about 7.8 mm.

Preferably, the first thermostatic bimetal sheet has a thickness of between about 100 microns and 500 microns, more preferably about 300 microns.

The thermostatic bimetal valve may comprise a second thermostatic bimetal sheet adjacent to the first thermostatic bimetal sheet, the second thermostatic bimetal sheet having one or more solid portions and one or more openings for allowing fluid communication between the aerosol-forming substrate and at least one of the one or more airflow channels.

In such embodiments, the one or more solid portions of one of the first and second thermostatic bimetal sheets are arranged to block the one or more openings of the other of the first and second thermostatic bimetal sheets when the valve is in the first position and to unblock at least one of the one or more openings of the other of the first and second thermostatic bimetal sheets when the valve is in the second position. Advantageously, such an arrangement can provide improved control of the airflow through the smoking article. Additionally, the valve may block the passage of air through the smoking article even if the valve is not in contact with the downstream end of the airflow channel through the combustible heat source.

In certain preferred embodiments, the second thermostatic bimetal sheet is a substantially circular thermostatic bimetal disk having a diameter of between about 5 mm and about 15 mm, more preferably between about 7 mm and about 9 mm, and most preferably about 7.8 mm.

Preferably, the second thermostatic bimetal sheet has a thickness of between about 100 microns and 500 microns, more preferably about 300 microns.

The first thermostatic bimetal sheet and the second thermostatic bimetal sheet may be attached together along at least a portion of their peripheries, for example using spot welding or ultrasonic welding.

Where the thermostatic bimetal valve comprises a second thermostatic bimetal sheet adjacent to the first thermostatic bimetal sheet, the second thermostatic bimetal sheet may be upstream or downstream of the first thermostatic bimetal sheet. Preferably, the upstream bimetal sheet has a central hole aligned with a central airflow channel of the heat source and the downstream thermostatic bimetal sheet has at least four off-centre openings. For example, the downstream thermostatic bimetal sheet has at least four peripheral openings. Advantageously, this allows hot air to be drawn through the central hole of the upstream thermostatic bimetal sheet with minimal increase in resistance to draw and to be distributed around the aerosol-forming substrate by the off-centre openings of the downstream thermostatic bimetal sheet, thereby exposing a larger area of the aerosol-forming substrate to hot passing air.

Alternatively, one or both of the first and second thermostatic bimetal sheets may have one or more slits passing through, or close to, their centre which are closed when the valve is in the first position and open when the valve is in the second position.

In certain preferred embodiments, the thermostatic bimetal valve may abut the rear face of the combustible heat source or, where provided, a non-combustible first barrier. Additionally or alternatively, the thermostatic bimetal valve may abut the aerosol-forming substrate.

In embodiments where the thermostatic bimetal valve abuts the rear face of the combustible heat source or a non-combustible first barrier provided on the rear face of the combustible heat source, the thermostatic bimetal valve may be glued to the rear face of the combustible heat source or to the non-combustible substantially air impermeable first barrier coating provided on the rear face of the combustible heat source, for example using carboxymethyl cellulose. Advantageously, this makes it easier to assemble the smoking article. Where the aerosol forming substrate includes at least one aerosol former, it may also reduce migration of glycerine from the aerosol-forming substrate The first thermostatic bimetal sheet and second thermostatic bimetal sheet are formed from two layers of metal or metal alloy having differing coefficients of thermal expansion. The two layers may be joined by any suitable conventional process, for example by cladding. Metals that can be joined together by cladding are shown in Table 1, in which 'o' indicates that the metals can be clad together.

TABLE 1

Metals that can be clad

| | Zirconium | Zinc Alloys | Zinc | Vanadium Alloys | Uranium | Titanium Aluminides | Titanium | Tin Alloys | Tin | Tantalum Alloys | Tantalum | Steel-Carbon | Steel-Alloy | Steel-Stainless-Ferritic | Steel-Stainless-Austenitic | Steel-Maraging | Silver Alloys |
|---|---|---|---|---|---|---|---|---|---|---|---|---|---|---|---|---|---|
| Aluminum (Pure) | ○ | ○ | ○ | ○ | ○ | ○ | ○ | ○ | ○ | ○ | ○ | ○ | ○ | ○ | ○ | ○ | ○ |
| Aluminum Alloys | × | ○ | ○ | ○ | ○ | ○ | ○ | ○ | ○ | ○ | ○ | ○ | ○ | ○ | ○ | ○ | ○ |
| Beryllium Alloys | ○ | × | × | × | × | × | × | ○ | ○ | × | × | × | × | × | × | × | ○ |
| Bismuth | ○ | ○ | ○ | ○ | ○ | ○ | ○ | ○ | ○ | ○ | ○ | ○ | ○ | ○ | ○ | ○ | ○ |
| Brass | ○ | ○ | ○ | ○ | ○ | × | × | ○ | ○ | ○ | × | × | ○ | ○ | ○ | ○ | ○ |
| Bronze | ○ | ○ | ○ | ○ | ○ | ○ | ○ | ○ | ○ | ○ | ○ | ○ | ○ | ○ | ○ | ○ | ○ |
| Cadmium | × | ○ | ○ | × | ○ | × | × | ○ | ○ | × | × | × | × | ○ | ○ | ○ | ○ |
| Cobalt Alloys | ○ | ○ | ○ | ○ | ○ | ○ | ○ | ○ | ○ | ○ | ○ | ○ | ○ | ○ | ○ | ○ | ○ |
| Copper | ○ | ○ | ○ | ○ | ○ | ○ | ○ | ○ | ○ | ○ | ○ | ○ | ○ | ○ | ○ | ○ | ○ |
| Copper-Nickel Alloys | ○ | ○ | ○ | ○ | ○ | ○ | ○ | ○ | ○ | ○ | ○ | ○ | ○ | ○ | ○ | ○ | ○ |
| Electrical Resistance Alloys | ○ | ○ | ○ | ○ | ○ | ○ | ○ | ○ | ○ | ○ | ○ | ○ | ○ | ○ | ○ | ○ | ○ |
| Gold | ○ | ○ | ○ | ○ | ○ | × | ○ | ○ | ○ | ○ | ○ | ○ | ○ | ○ | ○ | ○ | ○ |
| Iron | ○ | ○ | ○ | ○ | ○ | ○ | ○ | ○ | ○ | ○ | ○ | ○ | ○ | ○ | ○ | ○ | ○ |
| Lead | ○ | ○ | ○ | × | ○ | × | × | ○ | ○ | × | × | ○ | ○ | ○ | ○ | ○ | ○ |
| Magnesium | ○ | × | ○ | × | ○ | × | × | ○ | ○ | × | × | ○ | ○ | ○ | ○ | ○ | ○ |
| Magnesium Alloys | ○ | × | ○ | × | ○ | × | × | ○ | ○ | × | × | ○ | ○ | ○ | ○ | ○ | ○ |
| Monel | ○ | ○ | ○ | ○ | ○ | ○ | ○ | ○ | ○ | ○ | ○ | ○ | ○ | ○ | ○ | ○ | ○ |
| Nickel | ○ | ○ | ○ | ○ | ○ | ○ | ○ | ○ | ○ | ○ | ○ | ○ | ○ | ○ | ○ | ○ | ○ |
| Nickel Alloys | ○ | ○ | ○ | ○ | ○ | ○ | ○ | ○ | ○ | ○ | ○ | ○ | ○ | ○ | ○ | ○ | ○ |
| Nickel Aluminides | × | × | × | ○ | × | × | ○ | ○ | ○ | × | × | ○ | ○ | ○ | ○ | ○ | ○ |
| Niobium | ○ | ○ | ○ | ○ | ○ | ○ | ○ | ○ | ○ | ○ | ○ | ○ | ○ | ○ | ○ | ○ | ○ |
| Niobium Alloys | ○ | ○ | ○ | ○ | ○ | × | ○ | ○ | ○ | ○ | ○ | ○ | ○ | ○ | ○ | ○ | ○ |
| Palladium | ○ | ○ | ○ | ○ | ○ | ○ | ○ | ○ | ○ | ○ | ○ | ○ | ○ | ○ | ○ | ○ | ○ |
| Platinum | ○ | ○ | ○ | ○ | ○ | × | ○ | ○ | ○ | ○ | ○ | ○ | ○ | ○ | ○ | ○ | ○ |
| Rhenium | ○ | ○ | ○ | ○ | × | × | ○ | ○ | ○ | ○ | ○ | ○ | ○ | ○ | ○ | ○ | ○ |
| Silver | ○ | ○ | ○ | ○ | ○ | ○ | ○ | ○ | ○ | ○ | ○ | ○ | ○ | ○ | ○ | ○ | ○ |
| Silver Alloys | ○ | ○ | ○ | ○ | ○ | ○ | ○ | ○ | ○ | ○ | ○ | ○ | ○ | ○ | ○ | ○ | |
| Steel-Maraging | ○ | ○ | ○ | ○ | ○ | ○ | ○ | ○ | ○ | ○ | ○ | ○ | ○ | ○ | ○ | | |
| Steel-Stainless-Austenitic | ○ | ○ | ○ | ○ | ○ | ○ | ○ | ○ | ○ | ○ | ○ | ○ | ○ | ○ | | | |
| Steel-Stainless-Ferritic | ○ | ○ | ○ | ○ | × | ○ | ○ | ○ | ○ | ○ | ○ | ○ | ○ | | | | |
| Steel-Alloy | ○ | ○ | ○ | ○ | ○ | ○ | ○ | ○ | ○ | ○ | ○ | ○ | | | | | |
| Steel-Carbon | ○ | ○ | ○ | ○ | ○ | ○ | ○ | ○ | ○ | ○ | ○ | | | | | | |
| Tantalum | ○ | ○ | ○ | ○ | ○ | ○ | ○ | ○ | ○ | ○ | | | | | | | |
| Tantalum Alloys | ○ | ○ | ○ | ○ | ○ | ○ | ○ | ○ | ○ | | | | | | | | |
| Tin | ○ | ○ | ○ | ○ | ○ | ○ | ○ | ○ | | | | | | | | | |
| Tin Alloys | ○ | ○ | ○ | ○ | ○ | ○ | ○ | | | | | | | | | | |
| Titanium | ○ | ○ | ○ | × | ○ | ○ | | | | | | | | | | | |
| Titanium Aluminides | × | × | × | × | × | | | | | | | | | | | | |
| Uranium | × | ○ | ○ | ○ | | | | | | | | | | | | | |
| Vanadium Alloys | ○ | ○ | ○ | | | | | | | | | | | | | | |
| Zinc | ○ | ○ | | | | | | | | | | | | | | | |
| Zinc Alloys | ○ | | | | | | | | | | | | | | | | |
| Zirconium | | | | | | | | | | | | | | | | | |

TABLE 1-continued

Metals that can be clad

| | Silver | Rhenium | Platinum | Palladium | Niobium Alloys | Niobium | Nickel Aluminides | Nickel Alloys | Nickel | Monel | Magnesium Alloys | Magnesium | Lead | Iron | Gold | Electrical Resistance Alloys | Copper-Nickel Alloys |
|---|---|---|---|---|---|---|---|---|---|---|---|---|---|---|---|---|---|
| Aluminum (Pure) | ○ | ○ | ○ | ○ | ○ | ○ | ○ | ○ | ○ | ○ | × | × | ○ | ○ | ○ | ○ | ○ |
| Aluminum Alloys | ○ | ○ | ○ | ○ | ○ | ○ | ○ | ○ | ○ | ○ | ○ | ○ | ○ | ○ | ○ | ○ | ○ |
| Beryllium Alloys | ○ | × | ○ | ○ | × | × | ○ | ○ | × | × | × | × | ○ | × | ○ | × | ○ |
| Bismuth | ○ | ○ | ○ | ○ | × | × | × | ○ | ○ | ○ | ○ | ○ | ○ | × | ○ | × | ○ |
| Brass | ○ | ○ | ○ | ○ | ○ | ○ | ○ | ○ | ○ | ○ | × | × | ○ | ○ | ○ | ○ | ○ |
| Bronze | ○ | × | ○ | ○ | × | × | × | ○ | ○ | ○ | ○ | ○ | ○ | ○ | ○ | ○ | ○ |
| Cadmium | ○ | ○ | ○ | ○ | ○ | ○ | ○ | ○ | ○ | ○ | × | × | ○ | ○ | ○ | × | ○ |
| Cobalt Alloys | ○ | × | ○ | ○ | ○ | ○ | ○ | ○ | ○ | ○ | ○ | ○ | ○ | ○ | ○ | ○ | ○ |
| Copper | ○ | ○ | ○ | ○ | ○ | ○ | ○ | ○ | ○ | ○ | ○ | ○ | ○ | ○ | ○ | ○ | ○ |
| Copper-Nickel Alloys | ○ | ○ | ○ | ○ | ○ | ○ | ○ | ○ | ○ | ○ | ○ | ○ | ○ | ○ | ○ | ○ | |
| Electrical Resistance Alloys | ○ | ○ | ○ | ○ | ○ | ○ | ○ | ○ | ○ | ○ | ○ | ○ | ○ | ○ | ○ | | |
| Gold | ○ | × | ○ | ○ | ○ | ○ | × | ○ | ○ | ○ | ○ | ○ | ○ | ○ | | | |
| Iron | ○ | ○ | ○ | ○ | ○ | ○ | ○ | ○ | ○ | ○ | ○ | ○ | ○ | | | | |
| Lead | ○ | × | ○ | ○ | ○ | ○ | × | ○ | ○ | ○ | ○ | ○ | ○ | | | | |
| Magnesium | ○ | × | ○ | ○ | ○ | ○ | ○ | ○ | ○ | ○ | ○ | ○ | | | | | |
| Magnesium Alloys | ○ | ○ | ○ | ○ | ○ | ○ | ○ | ○ | ○ | ○ | ○ | | | | | | |
| Monel | ○ | ○ | ○ | ○ | ○ | ○ | ○ | ○ | ○ | ○ | | | | | | | |
| Nickel | ○ | ○ | ○ | ○ | ○ | ○ | ○ | ○ | ○ | | | | | | | | |
| Nickel Alloys | ○ | × | ○ | ○ | ○ | ○ | ○ | ○ | | | | | | | | | |
| Nickel Aluminides | ○ | ○ | ○ | ○ | ○ | ○ | ○ | | | | | | | | | | |
| Niobium | ○ | ○ | ○ | ○ | ○ | | | | | | | | | | | | |
| Niobium Alloys | ○ | ○ | ○ | ○ | | | | | | | | | | | | | |
| Palladium | ○ | ○ | ○ | | | | | | | | | | | | | | |
| Platinum | ○ | ○ | | | | | | | | | | | | | | | |
| Rhenium | ○ | | | | | | | | | | | | | | | | |
| Silver | | | | | | | | | | | | | | | | | |
| Silver Alloys | | | | | | | | | | | | | | | | | |
| Steel-Maraging | | | | | | | | | | | | | | | | | |
| Steel-Stainless-Austenitic | | | | | | | | | | | | | | | | | |
| Steel-Stainless-Ferritic | | | | | | | | | | | | | | | | | |
| Steel-Alloy | | | | | | | | | | | | | | | | | |
| Steel-Carbon | | | | | | | | | | | | | | | | | |
| Tantalum | | | | | | | | | | | | | | | | | |
| Tantalum Alloys | | | | | | | | | | | | | | | | | |
| Tin | | | | | | | | | | | | | | | | | |
| Tin Alloys | | | | | | | | | | | | | | | | | |
| Titanium | | | | | | | | | | | | | | | | | |
| Titanium Aluminides | | | | | | | | | | | | | | | | | |
| Uranium | | | | | | | | | | | | | | | | | |
| Vanadium Alloys | | | | | | | | | | | | | | | | | |
| Zinc | | | | | | | | | | | | | | | | | |
| Zinc Alloys | | | | | | | | | | | | | | | | | |
| Zirconium | | | | | | | | | | | | | | | | | |

TABLE 1-continued

Metals that can be clad

| | Copper | Cobalt Alloys | Cadmium | Bronze | Brass | Bismuth | Beryllium Alloys | Aluminum Alloys | Aluminum |
|---|---|---|---|---|---|---|---|---|---|
| Aluminum (Pure) | | | | | | | | | o |
| Aluminum Alloys | o | o | o | o | o | o | | | o |
| Beryllium Alloys | o | x | x | o | o | x | x | o | |
| Bismuth | o | x | o | o | o | o | x | o | |
| Brass | o | o | o | o | | | | | |
| Bronze | o | o | o | | | | | | |
| Cadmium | o | x | o | | | | | | |
| Cobalt Alloys | o | o | | | | | | | |
| Copper | o | | | | | | | | |
| Copper-Nickel Alloys | | | | | | | | | |
| Electrical Resistance Alloys | | | | | | | | | |
| Gold | | | | | | | | | |
| Iron | | | | | | | | | |
| Lead | | | | | | | | | |
| Magnesium | | | | | | | | | |
| Magnesium Alloys | | | | | | | | | |
| Monel | | | | | | | | | |
| Nickel | | | | | | | | | |
| Nickel Alloys | | | | | | | | | |
| Nickel Aluminides | | | | | | | | | |
| Niobium | | | | | | | | | |
| Niobium Alloys | | | | | | | | | |
| Palladium | | | | | | | | | |
| Platinum | | | | | | | | | |
| Rhenium | | | | | | | | | |
| Silver | | | | | | | | | |
| Silver Alloys | | | | | | | | | |
| Steel-Maraging | | | | | | | | | |
| Steel-Stainless-Austenitic | | | | | | | | | |
| Steel-Stainless-Ferritic | | | | | | | | | |
| Steel-Alloy | | | | | | | | | |
| Steel-Carbon | | | | | | | | | |
| Tantalum | | | | | | | | | |
| Tantalum Alloys | | | | | | | | | |
| Tin | | | | | | | | | |
| Tin Alloys | | | | | | | | | |
| Titanium | | | | | | | | | |
| Titanium Aluminides | | | | | | | | | |
| Uranium | | | | | | | | | |
| Vanadium Alloys | | | | | | | | | |
| Zinc | | | | | | | | | |
| Zinc Alloys | | | | | | | | | |
| Zirconium | | | | | | | | | |

Smoking articles according to the invention preferably comprise an aerosol-forming substrate comprising at least one aerosol-former and a material capable of releasing volatile compounds in response to heating. The aerosol-forming substrate may comprise other additives and ingredients including, but not limited to, humectants, flavourants, binders and mixtures thereof.

Preferably, the aerosol-forming substrate comprises nicotine. More preferably, the aerosol-forming substrate comprises tobacco.

The at least one aerosol-former may be any suitable known compound or mixture of compounds that, in use, facilitates formation of a dense and stable aerosol and that is substantially resistant to thermal degradation at the temperature at which the aerosol-former generates aerosol by the transfer of heat from the combustible heat source to the aerosol-forming substrate. Suitable aerosol-formers are well known in the art and include, for example, polyhydric alcohols, esters of polyhydric alcohols, such as glycerol mono-, di- or triacetate, and aliphatic esters of mono-, di- or polycarboxylic acids, such as dimethyl dodecanedioate and dimethyl tetradecanedioate. Preferred aerosol formers for use in smoking articles according to the invention are polyhydric alcohols or mixtures thereof, such as triethylene glycol, 1,3-butanediol and, most preferred, glycerine.

The material capable of emitting volatile compounds in response to heating may be a charge of plant-based material. The material capable of emitting volatile compounds in response to heating may be a charge of homogenised plant-based material. For example, the aerosol-forming substrate may comprise one or more materials derived from plants including, but not limited to: tobacco; tea, for example green tea; peppermint; laurel; eucalyptus; basil; sage; verbena; and tarragon.

Preferably, the material capable of emitting volatile compounds in response to heating is a charge of tobacco-based material, most preferably a charge of homogenised tobacco-based material.

The aerosol-forming substrate may be in the form of a plug or segment comprising a material capable of emitting volatile compounds in response to heating circumscribed by a paper or other wrapper. As stated above, where an aerosol-forming substrate is in the form of such a plug or segment, the entire plug or segment including any wrapper is considered to be the aerosol-forming substrate.

Preferably, the aerosol-forming substrate has a length of between about 5 mm and about 20 mm, more preferably of between about 8 mm and about 12 mm.

In preferred embodiments, the aerosol-forming substrate comprises a plug of tobacco-based material wrapped in a plug wrap. In particular preferred embodiments, the aerosol-forming substrate comprises a plug of homogenised tobacco-based material wrapped in a plug wrap.

Preferably, smoking articles according to the invention further comprise one or more heat-conducting elements around a rear portion of the combustible heat source and at least a front portion of the aerosol-forming substrate. The heat-conducting element is preferably combustion resistant. In certain embodiments, the heat conducting element is oxygen restricting. In other words, the heat-conducting element inhibits or resists the passage of oxygen through the heat-conducting element to the combustible heat source.

In certain embodiments, the heat-conducting element may be in direct contact with both the rear portion of the combustible heat source and the aerosol-forming substrate. In such embodiments, the heat-conducting element provides a thermal link between the combustible heat source and the aerosol-forming substrate of smoking articles according to the invention.

In other embodiments, the heat-conducting element may be spaced apart from one or both of the rear portion of the combustible heat source and the aerosol-forming substrate, such that there is no direct contact between the heat-conducting element and one or both of the rear portion of the combustible heat source and the aerosol-forming substrate.

Suitable heat-conducting elements for use in smoking articles according to the invention include, but are not limited to: metal foil wrappers such as, for example, aluminium foil wrappers, steel wrappers, iron foil wrappers and copper foil wrappers; and metal alloy foil wrappers.

Preferably, the rear portion of the combustible heat source surrounded by the heat-conducting element is between about 2 mm and about 8 mm in length, more preferably between about 3 mm and about 5 mm in length.

Preferably, the front portion of the combustible heat source not surrounded by the heat-conducting element is between about 4 mm and about 15 mm in length, more preferably between about 5 mm and about 8 mm in length.

In certain embodiments, the entire length of the aerosol-forming substrate may be surrounded by the heat-conducting element.

In other embodiments, the heat-conducting element may surround only a front portion of the aerosol-forming substrate. In such embodiments, the aerosol-forming substrate extends downstream beyond the heat-conducting element.

In embodiments in which the heat-conducting element surrounds only a front portion of the aerosol-forming substrate, the aerosol-forming substrate preferably extends at least about 3 mm downstream beyond the heat-conducting element. More preferably, the aerosol-forming substrate extends between about 3 mm and about 10 mm downstream beyond the heat-conducting element. However, the aerosol-forming substrate may extend less than 3 mm downstream beyond the heat-conducting element.

Preferably, the front portion of the aerosol-forming substrate surrounded by the heat-conducting element is between about 1 mm and about 10 mm in length, more preferably between about 2 mm and about 8 mm in length, most preferably between about 2 mm and about 6 mm in length.

Smoking articles according to the invention preferably comprise a mouthpiece downstream of the aerosol-forming substrate.

Preferably, the mouthpiece is of low filtration efficiency, more preferably of very low filtration efficiency. The mouthpiece may be a single segment or component mouthpiece. Alternatively, the mouthpiece may be a multi-segment or multi-component mouthpiece.

The mouthpiece may comprise a filter comprising one or more segments comprising suitable known filtration materials. Suitable filtration materials are known in the art and include, but are not limited to, cellulose acetate and paper. Alternatively or in addition, the mouthpiece may comprise one or more segments comprising absorbents, adsorbents, flavourants, and other aerosol modifiers and additives or combinations thereof.

Smoking articles according to the element preferably further comprise a transfer element or spacer element between the aerosol-forming substrate and the mouthpiece.

The transfer element may abut one or both of the aerosol-forming substrate and the mouthpiece. Alternatively, the transfer element may be spaced apart from one or both of the aerosol-forming substrate and the mouthpiece.

The inclusion of a transfer element advantageously allows cooling of the aerosol generated by heat transfer from the combustible heat source to the aerosol-forming substrate. The inclusion of a transfer element also advantageously allows the overall length of smoking articles according to the invention to be adjusted to a desired value, for example to a length similar to that of conventional cigarettes, through an appropriate choice of the length of the transfer element.

The transfer element may have a length of between about 7 mm and about 50 mm, for example a length of between about 10 mm and about 45 mm or of between about 15 mm and about 30 mm. The transfer element may have other lengths depending upon the desired overall length of the smoking article, and the presence and length of other components within the smoking article.

Preferably, the transfer element comprises at least one open-ended tubular hollow body. In such embodiments, in use, the air drawn into the smoking article through the one or more air inlets passes through the at least one open-ended tubular hollow body as it passes downstream through the smoking article from the aerosol-forming substrate to the mouthpiece.

The transfer element may comprise at least one open-ended tubular hollow body formed from one or more suitable materials that are substantially thermally stable at the temperature of the aerosol generated by the transfer of heat from the combustible heat source to the aerosol-forming substrate. Suitable materials are known in the art and include, but are not limited to, paper, cardboard, plastics, such a cellulose acetate, ceramics and combinations thereof.

Preferably, smoking articles according to the invention comprise an outer wrapper that circumscribes the aerosol-forming substrate and at least a rear portion of the combustible heat source. The outer wrapper should grip the combustible heat source and the aerosol-forming substrate of the smoking article when the smoking article is assembled.

More preferably, smoking articles according to the invention comprise an outer wrapper that circumscribes the aerosol-forming substrate, any other components of the smoking article downstream of the aerosol-forming substrate, and at least a rear portion of the combustible heat source.

Preferably, the outer wrapper is substantially air impermeable.

Smoking articles according to the invention may comprise outer wrappers formed from any suitable material or combination of materials. Suitable materials are well known in the art and include, but are not limited to, cigarette paper.

Smoking articles according to the invention may be assembled using known methods and machinery.

The invention will be further described, by way of example only, with reference to the accompanying drawings in which:

FIG. 1B shows a front view of the thermostatic valve of the smoking article of FIG. 1A;

FIG. 1C shows a cross-sectional view of the thermostatic valve of FIG. 1B taken through line 1C in FIG. 1B;

FIG. 2B shows a front view of the thermostatic valve of the smoking article of FIG. 2A;

FIG. 2C shows a cross-sectional view of the thermostatic valve of FIG. 2B taken through line 2C in FIG. 2B;

Figure 1A:
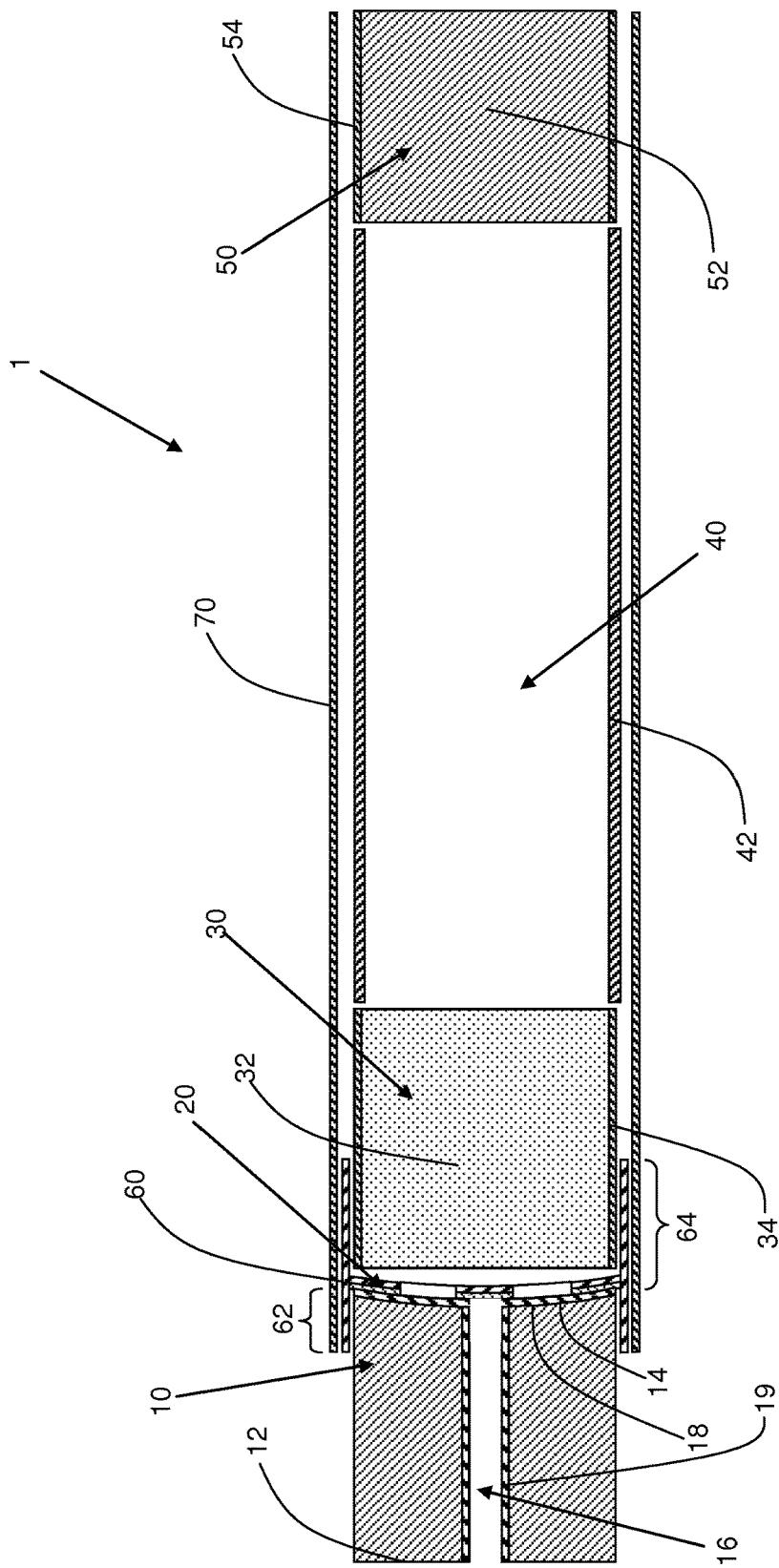
FIG. 1A shows a schematic longitudinal cross-section of a smoking article according to a first embodiment of the invention, in which the thermostatic valve is shown in the first position.

The smoking article 1 according to the first embodiment of the invention shown in FIGS. 1A to 1D comprises a combustible heat source 10 having a front face 12 and an opposed rear face 14, a thermostatic bimetal valve 20, an aerosol-forming substrate 30, a transfer element 40 and a mouthpiece 50 in coaxial alignment. The thermostatic bimetal valve 20, the aerosol-forming substrate 30, transfer element 40 and mouthpiece 50 and a rear portion of the combustible heat source 10 are wrapped in an outer wrapper 70 of sheet material such as, for example, cigarette paper, of low air permeability.

The combustible heat source 10 is cylindrical and comprises a central airflow channel 16 that extends from the front face 12 to the rear face 14 of the combustible heat source 10. As shown in FIG. 1D, the rear face 14 of the combustible heat source 10 is concave and a non-combustible substantially air impermeable first barrier 18 in the form of a disk of aluminium foil is provided on the rear face 14 of the combustible heat source 10. The first barrier 18 is applied by pressing the disk of aluminium foil onto the rear face 14 of the combustible heat source 10 and abuts the rear face 14 of the combustible heat source 10. A non-combustible substantially air impermeable second barrier in the form of a hollow tube 19 is inserted into the airflow channel 16.

The thermostatic bimetal valve 20 is located immediately downstream of the combustible heat source 10 and is adhered to the first barrier 18 towards its radially outermost edge. As shown in FIGS. 1B and 1C, the thermostatic bimetal valve 20 comprises a two-layer thermostatic bimetal disk 21 having an upstream layer 22 formed from a material having a low coefficient of thermal expansion, such as steel, and a downstream layer 24 formed from a material having a high coefficient of thermal expansion, such as copper. The two layers are clad together and a curvature, which corresponds to that of the rear face 14 of the combustible heat source 10, is preformed by stamping. The thermostatic bimetal disk has four peripheral openings 26, in the form of circular holes of approximately 0.6 mm diameter, and a central solid portion 28 which is larger than the diameter of the downstream end of the central airflow channel 16 of the combustible heat source 10.

The aerosol-forming substrate 30 is located downstream and spaced apart from the rear face 14 of the combustible heat source 10. The aerosol-forming substrate 30 comprises a cylindrical plug of homogenised tobacco-based material 32 including an aerosol former such as, for example, glycerine, wrapped in filter plug wrap 34.

The transfer element 40 is located immediately downstream of the aerosol-forming substrate 30 and comprises a cylindrical open-ended hollow tube 42 of suitable material such as, for example, paper, cardboard or cellulose acetate tow.

The mouthpiece 50 is located immediately downstream of the transfer element 40 at the proximal end of the smoking article 1. The mouthpiece 50 comprises a cylindrical plug of suitable filtration material 52 such as, for example, cellulose acetate tow of very low filtration efficiency, wrapped in filter plug wrap 54.

The smoking article may further comprise a band of tipping paper (not shown) circumscribing a downstream end portion of the outer wrapper 70.

Figure 1D:
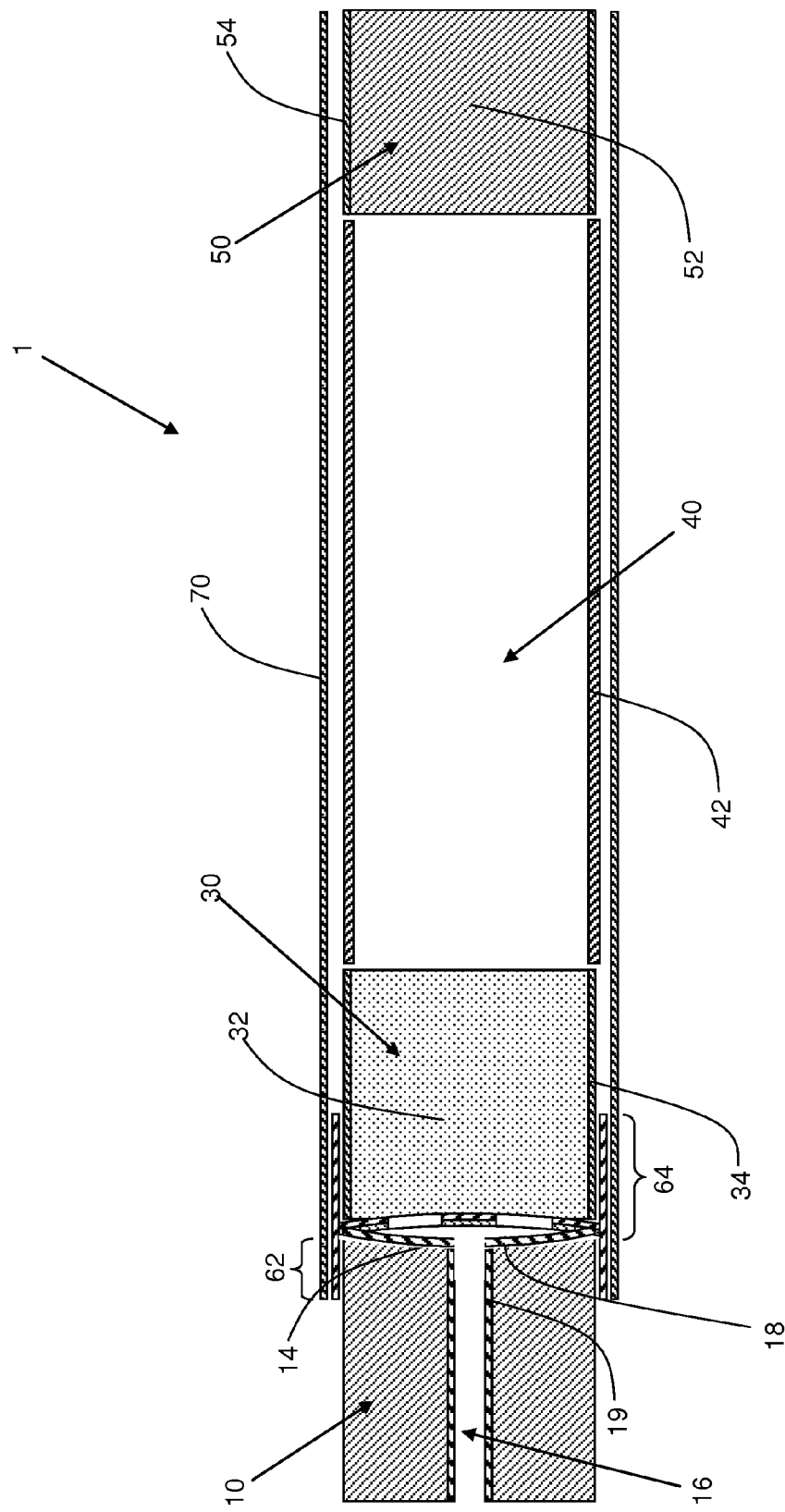
FIG. 1D shows a schematic longitudinal cross-section of the smoking article of FIG. 1A, in which the thermostatic valve is shown in the second position.

As shown in FIG. 1A, the smoking article 1 further comprises a heat-conducting element 60 of suitable material such as, for example, aluminium foil, around and in contact with a rear portion 62 of the combustible carbonaceous heat source 10 and a front portion 64 of the aerosol-forming substrate 30. In the smoking article 1 according to the first embodiment of the invention, the aerosol-forming substrate 30 extends downstream beyond the heat-conducting element 60. That is, the heat-conducting element 60 is not around and in contact with a rear portion of the aerosol-forming substrate 30. However, it will be appreciated that, in other embodiments (not shown), the heat-conducting element 60 may be around and in contact with the entire length of the aerosol-forming substrate 30 and that one or more further heat-conducting layers may be provided.

In use, a user ignites the combustible heat source 10 of the smoking article 1 according to the first embodiment of the invention. During ignition of the combustible heat source 10, the thermostatic bimetal valve 20 is in the first position, as shown in FIG. 1A. In the first position, the central solid portion 28 of the disk 21 blocks the downstream end of the central airflow channel 16 to substantially prevent air from being drawn through the airflow channel 16. Thus, even if the user draws on the mouthpiece 50 during ignition of the combustible heat source 10, air is substantially prevented from being drawn into the aerosol-forming substrate 30 and being delivered to the user through the mouthpiece 50.

As the combustible heat source 10 heats up, heat is transferred to the thermostatic bimetal valve 20 by conduction through the abutting rear face 14 of the combustible heat source 10 and via the heat-conducting element 60. The front portion 64 of the aerosol-forming substrate 30 is also heated by the combustible heat source 10 via the thermostatic bimetal valve 20 and the heat-conducting element 60. As heat is transferred to the valve 20, the temperature of the valve 20 rises until it reaches the threshold temperature, at which point the valve 20 snaps from the first position to the second position shown in FIG. 1D.

In the second position, the bimetal disk 21 of the thermostatic bimetal valve 20 is convex and the central solid portion 28 of the disk 21 is spaced apart from the downstream end of the airflow channel 16 of the combustible heat source 10. In this position, the aerosol-forming substrate 30 is in fluid communication with the combustible heat source 10 via the openings 26 of the thermostatic bimetal disk 21 of the valve 20.

When a user draws on the mouthpiece 50, air is drawn into the aerosol-forming substrate 30 of the smoking article 1 through the central airflow channel 16 of the combustible heat source 10 and the openings 26 of the thermostatic bimetal valve 20. The air is heated as it passes through the central airflow channel 16 of the combustible heat source 10 and heats the aerosol-forming substrate 30 by convection as it passes downstream through the aerosol-forming substrate 30 towards the mouthpiece 50 of the smoking article 1.

The heating of the aerosol-forming substrate 30 by conduction and convection releases glycerine and other volatile and semi-volatile compounds from the plug of homogenised tobacco-based material 32. The compounds released from the aerosol-forming substrate 30 form an aerosol that is entrained in the air drawn through the central airflow channel 16 of the combustible heat source 10 as it flows through the aerosol-forming substrate 30. The drawn air and entrained aerosol pass downstream through the transfer element 40, where they cool and condense. The cooled drawn air and entrained aerosol pass downstream through the mouthpiece 50 and are delivered to the user through the proximal end of the smoking article 1 according to the first embodiment of the invention.

When the rate of combustion of the combustible heat source 10 reduces and its temperature falls, the heat transferred to the thermostatic bimetal valve 20 also falls. As the temperature of the thermostatic bimetal valve 20 falls to below the threshold temperature, the thermostatic bimetal disk 21 returns to the first, concave, position shown in FIG. 1 to substantially prevent air from being drawn through the smoking article 1 by the user.

Figure 2A:
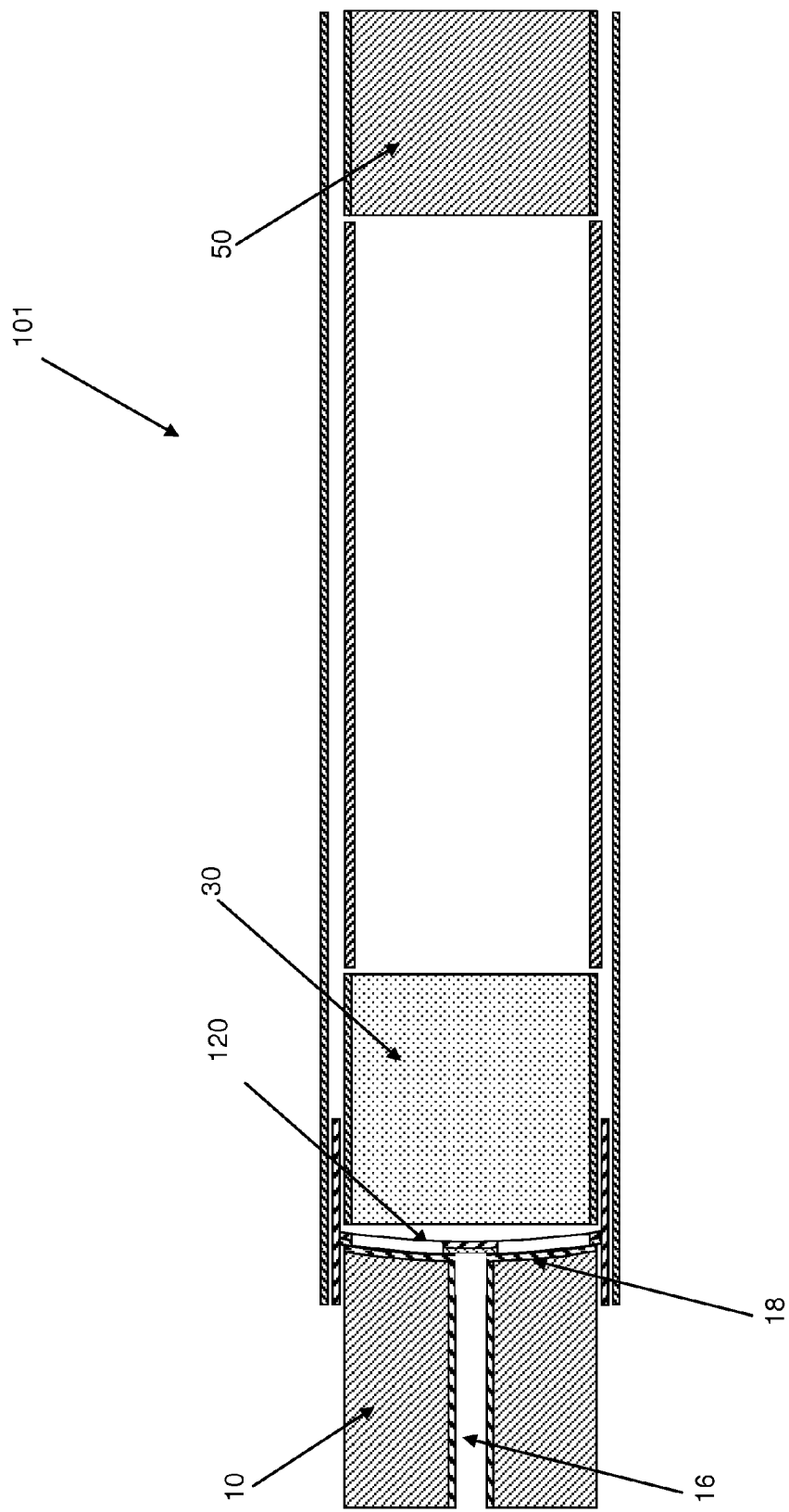
FIG. 2A shows a schematic longitudinal cross-section of a smoking article according to a second embodiment of the invention, in which the thermostatic valve is shown in the first position.

The smoking article 101 according to the second embodiment of the invention shown in FIGS. 2A to 2C is of largely identical construction to the smoking article 1 according to the first embodiment of the invention. However, in smoking article 101, the off-centre openings of the thermostatic bimetal valve 120 are formed from four cut-out segments 126, leaving a cross-shaped solid portion 128.

In use, during ignition of the combustible heat source 10 of the smoking article 101 by the user, the thermostatic bimetal valve 120 is in the first position, as shown in FIG. 2A. In the first position, the centre of the cross-shaped solid portion 128 of the thermostatic bimetal disk 121 covers the downstream end of the central airflow channel 16 of the combustible heat source 10 to substantially prevent air from being drawn through the airflow channel 16. Thus, even if the user draws on the mouthpiece 50 during ignition of the combustible heat source 10, air is substantially prevented from being drawn into the aerosol-forming substrate 30 and being delivered to the user through the mouthpiece 50.

When the temperature of the valve 120 reaches the threshold temperature, the valve 120 snaps from the first position to a second position (not shown) in which the disk 121 is convex and its central solid portion 128 is spaced apart from the downstream end of the airflow channel 16 of the combustible heat source 10. In this position, the aerosol-forming substrate 30 is in fluid communication with the combustible heat source 10 via the cut-out segments 126 of the thermostatic bimetal valve 120. When a user draws on the mouthpiece 50, air is drawn into the aerosol-forming substrate 30 of the smoking article 101 through the central airflow channel 16 of the combustible heat source 10 and the cut-out segments 126 of the thermostatic bimetal disk 121 of the valve 120.

When the rate of combustion of the combustible heat source 10 reduces and its temperature falls, the heat transferred to the thermostatic bimetal valve 120 also falls. As the temperature of the thermostatic bimetal valve 120 falls to below the threshold temperature, the thermostatic bimetal disk 121 returns to the first, concave, position shown in FIG. 2A to substantially prevent air from being drawn through the smoking article 101 by the user.

Figure 3A:
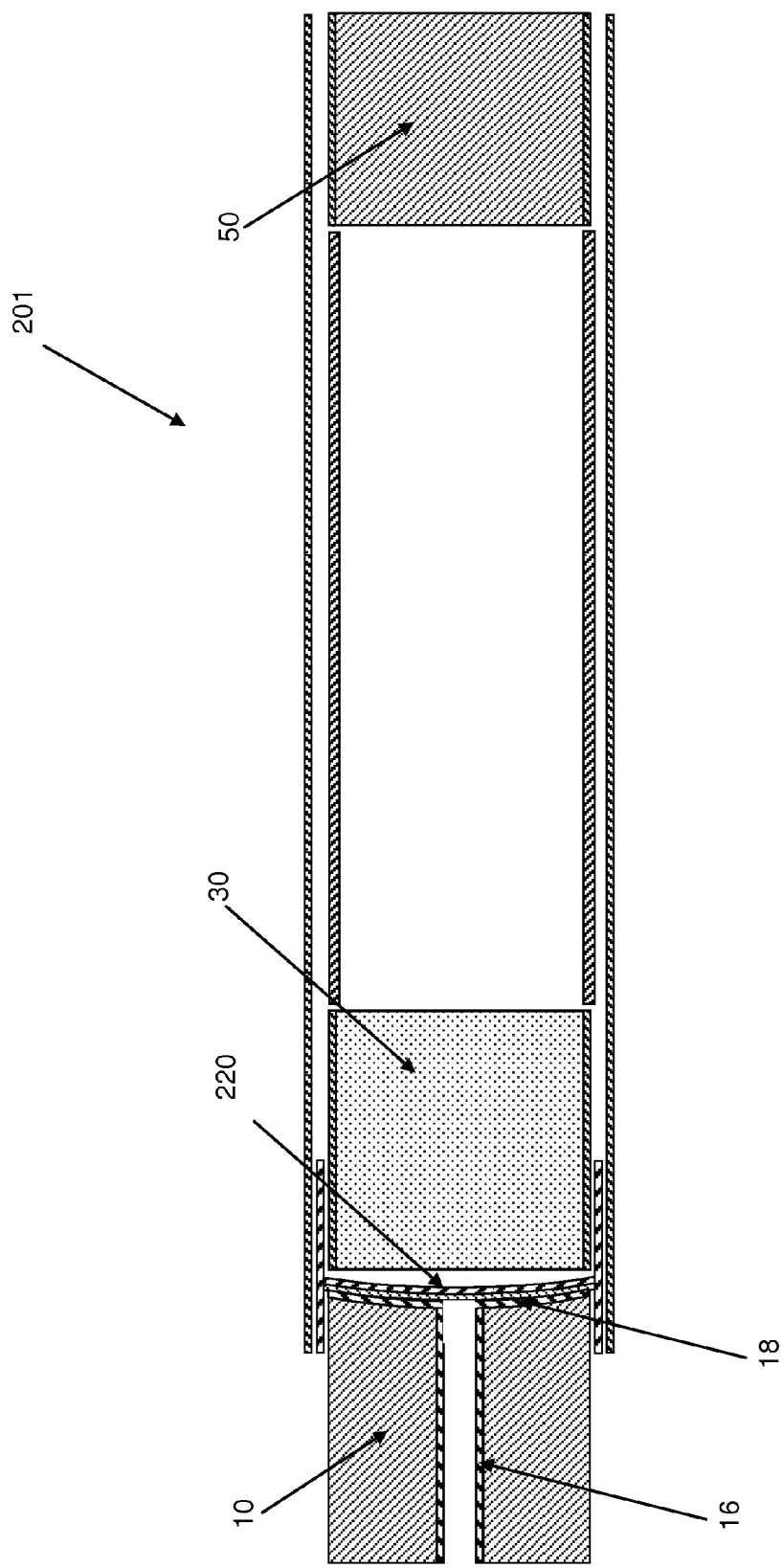
FIG. 3A shows a schematic longitudinal cross-section of a smoking article according to a third embodiment of the invention, in which the thermostatic valve is shown in the first position.
Figure 3B:
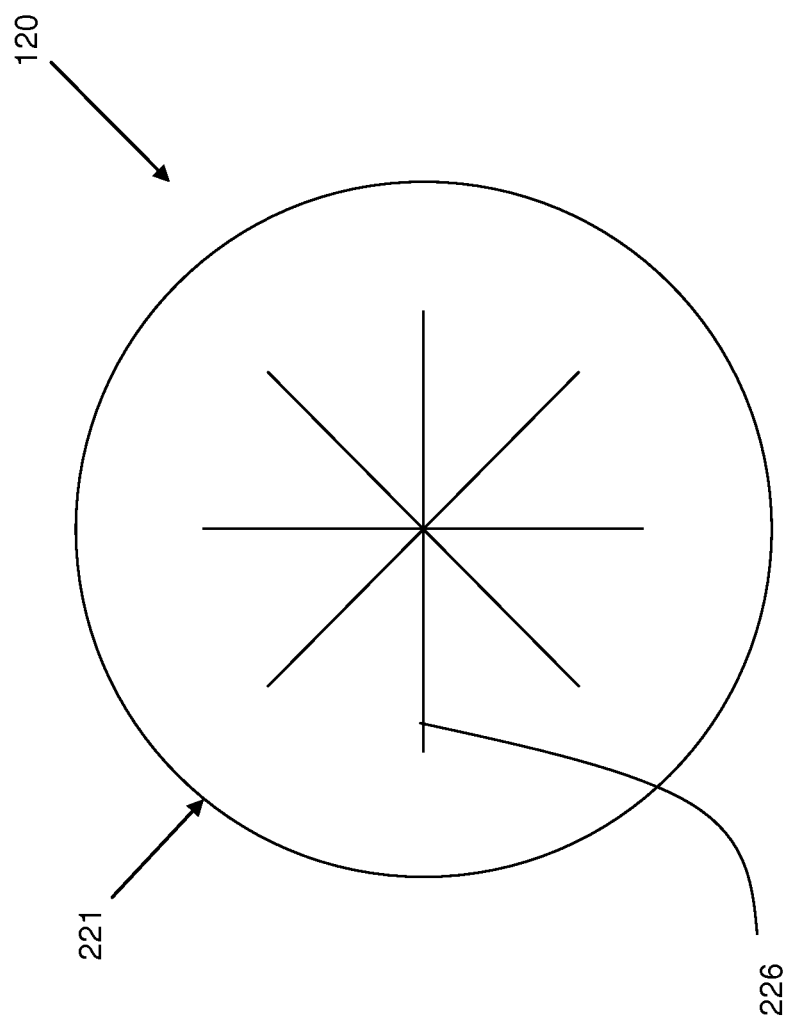
FIG. 3B shows a front view of the thermostatic valve of the smoking article of FIG. 3A.

The smoking article 201 according to the third embodiment of the invention shown in FIGS. 3A to 3C is of largely identical construction to the smoking article 1 according to the first embodiment of the invention. However, in smoking article 201, the thermostatic bimetal disk 221 of valve 220 has four radial slits 226 bisecting its central portion, rather than off-centre openings.

In use, during ignition of the combustible heat source 210 of the smoking article 201 by the user, the thermostatic bimetal valve 220 is in the first position, as shown in FIG. 3A. In the first position, the slits 226 are substantially closed to substantially prevent air from being drawn through the airflow channel 16. Thus, even if the user draws on the mouthpiece 50 during ignition of the combustible heat source 10, air is substantially prevented from being drawn into the aerosol-forming substrate 30 and being delivered to the user through the mouthpiece 50.

When the temperature of the valve 220 reaches the threshold temperature, the valve 220 snaps from the first position to a second position (not shown) in which the disk 221 is convex and the slits 226 are opened due to the deformation of the disk 221 in the second position. In this position, the aerosol-forming substrate 30 is in fluid communication with the combustible heat source 10 via the opened slits 226 of the thermostatic bimetal disk 221. When a user draws on the mouthpiece 50, air is drawn into the aerosol-forming substrate 30 of the smoking article 201 through the central airflow channel 16 of the combustible heat source 10 and the open slits 226 of the thermostatic bimetal disk 221 of the valve 220.

When the rate of combustion of the combustible heat source 10 reduces and its temperature falls, the heat transferred to the thermostatic bimetal valve 220 also falls. As the temperature of the thermostatic bimetal valve 220 falls to below the threshold temperature, the thermostatic bimetal valve 220 returns to the first position shown in FIG. 3A to substantially prevent air from being drawn through the smoking article 201 by the user.

Figure 4A:
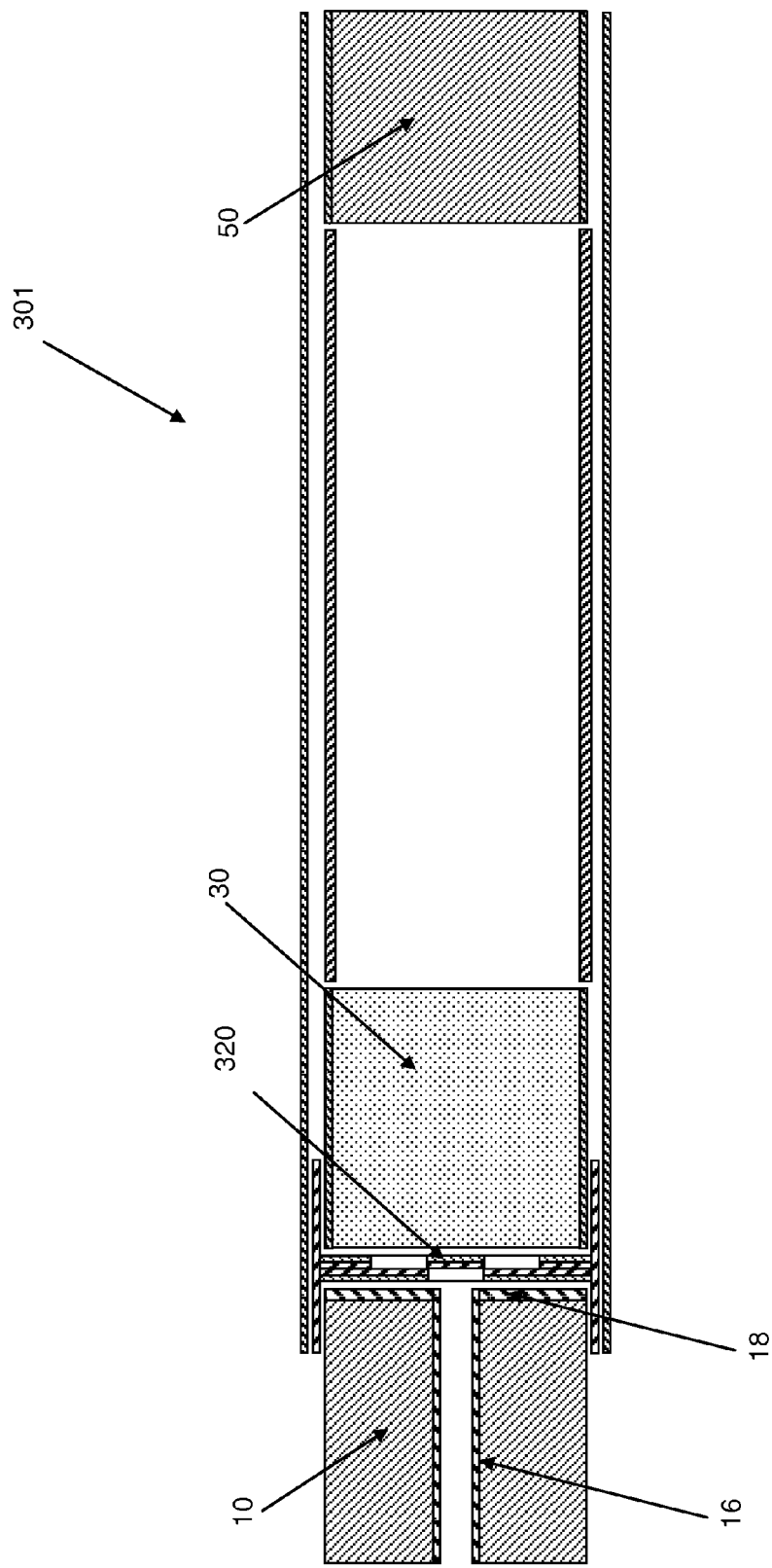
FIG. 4A shows a schematic longitudinal cross-section of a smoking article according to a fourth embodiment of the invention, in which the thermostatic valve is shown in the first position.
Figure 4C:
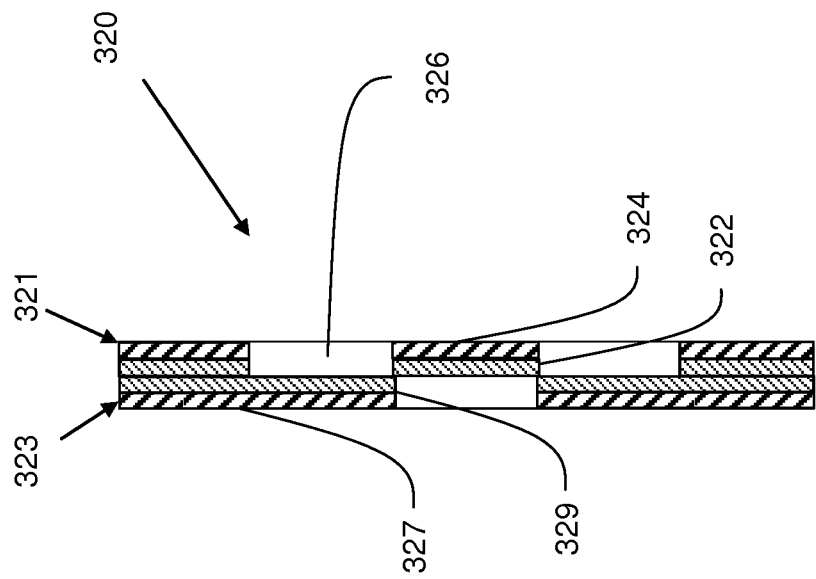
FIG. 4C shows a cross-sectional view of the thermostatic valve of FIG. 4B taken through line 4C in FIG. 4B.
Figure 4B:
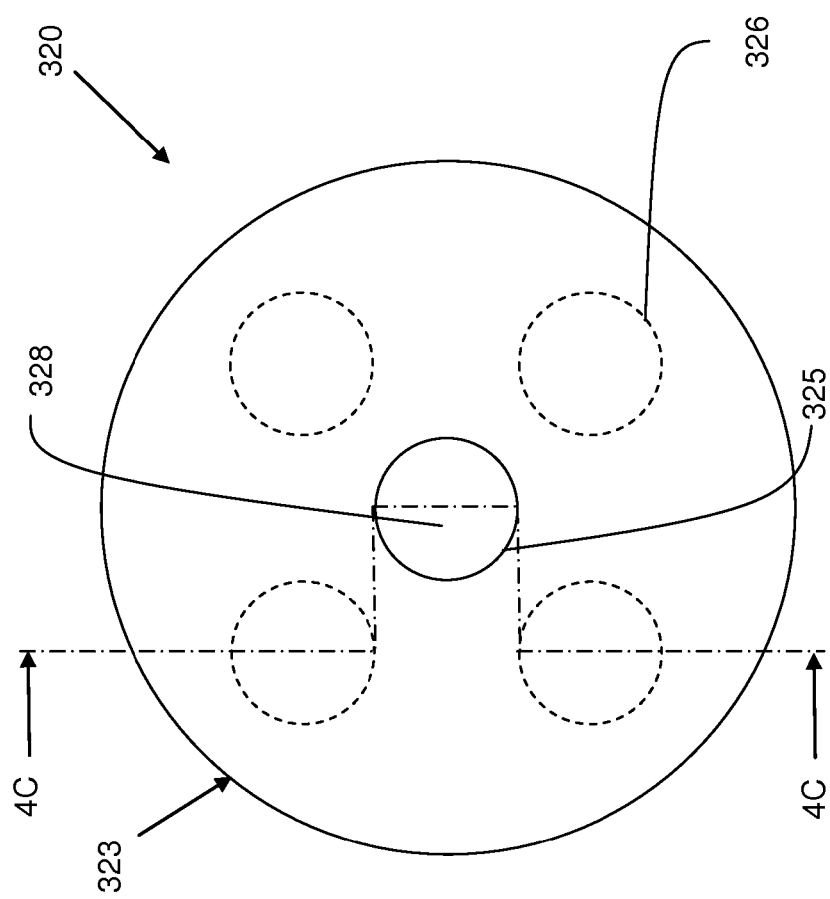
FIG. 4B shows a front view of the thermostatic valve of the smoking article of FIG. 4A.

The smoking article 301 according to the fourth embodiment of the invention shown in FIGS. 4A to 4D is of largely identical construction to the smoking article 1 according to the first embodiment of the invention. However, in smoking article 301, the thermostatic bimetal valve further comprises a second bimetal disk 323 upstream of the first bimetal disk 321. The first bimetal disk 321 has an upstream layer 322 formed from a material having a high coefficient of thermal expansion, such as copper, and a downstream layer 324 formed from a material having a low coefficient of thermal expansion, such as steel. The first bimetal disk 321 has four peripheral openings 326, in the form of circular holes of approximately 0.6 mm diameter, and a central solid portion 328. The second bimetal disk 323 and the first bimetal disk 321 are substantially planar and are welded together at their peripheries. As shown in FIGS. 4B and 4C, the second bimetal disk 323 has a central opening 325 which is offset from the off-centre openings 326 of the first bimetal disk 321. The remainder of the second bimetal disk 323 is solid. Like the first bimetal disk 321, the second bimetal disk 323 is formed from two layers. Unlike the first bimetal disk 321, the upstream layer 327 of the second bimetal disk 323 is formed from a material having a high coefficient of thermal expansion, such as copper, and the downstream layer 329 of the second bimetal disk 323 is formed from a material having a low coefficient of thermal expansion, such as steel. Thus, the layers 322, 329 of the disks 321 and 323 which have the lower coefficient of thermal expansion are sandwiched between the layers 324, 327 having the higher coefficient of thermal expansion.

In use, during ignition of the combustible heat source 10 of the smoking article 301 by the user, the thermostatic bimetal valve 320 is in the first position, as shown in FIG. 4A. In the first position, the central opening 325 of the second bimetal disk 323 is substantially blocked by the central solid portion 328 of the first bimetal disk 321 and the off-centre openings 326 of the first bimetal disk 321 are substantially blocked by the remainder of the second bimetal disc 323. As the thermostatic bimetal valve 320 extends across the inner diameter of the smoking article 301, the thermostatic bimetal valve 320 substantially blocks the inner diameter of the smoking article 301 and substantially prevents air from being drawn through the airflow channel 16. Thus, even if the user draws on the mouthpiece 50 during ignition of the combustible heat source 10, air is substantially prevented from being drawn into the aerosol-forming substrate 30 and being delivered to the user through the mouthpiece 50.

Figure 4D:
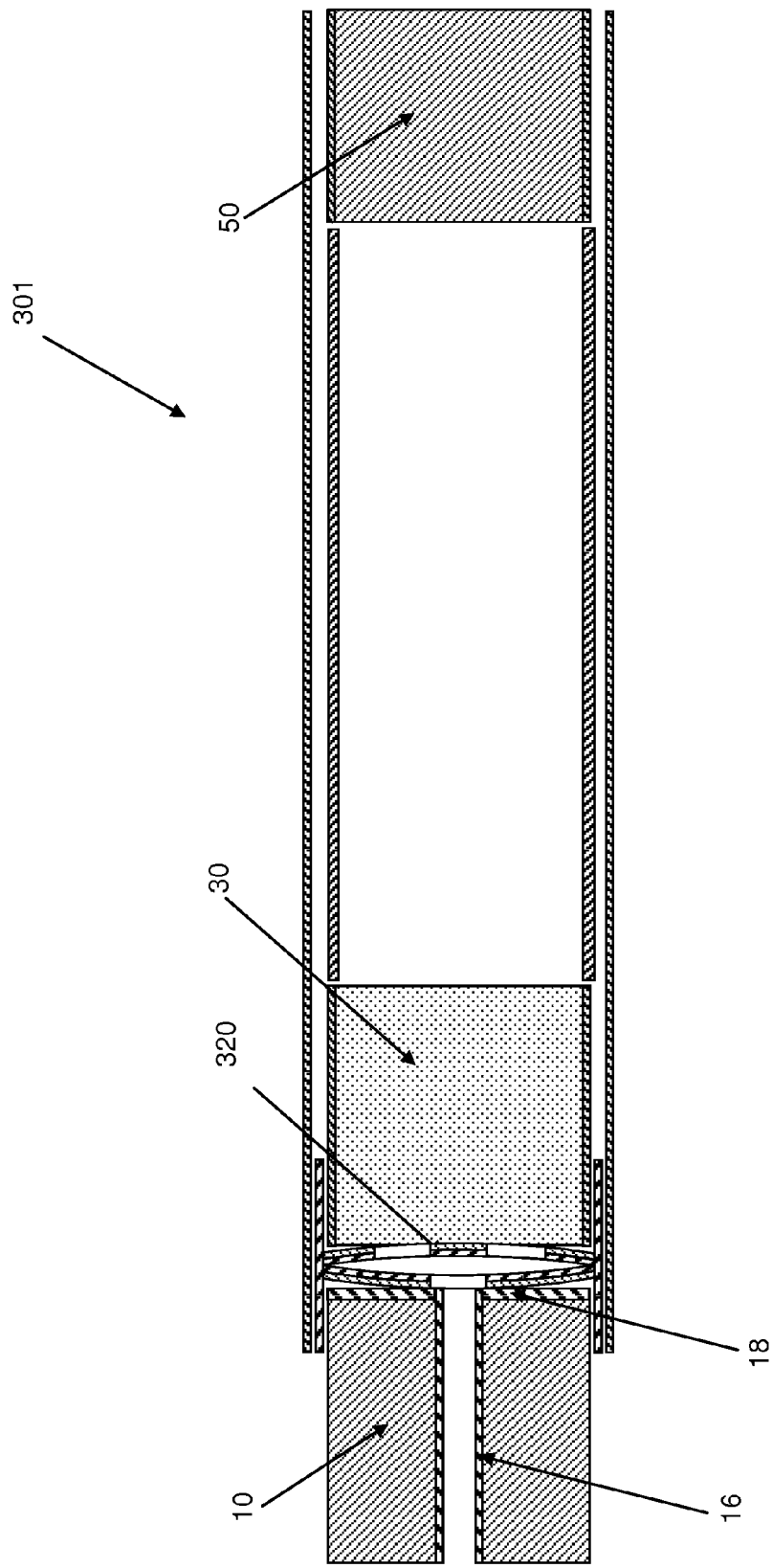
FIG. 4D shows a schematic longitudinal cross-section of the smoking article of FIG. 4A, in which the thermostatic valve is shown in the second position.

When the temperature of the valve 320 reaches the threshold temperature, the valve 320 deforms from the first position to the second position shown in FIG. 4D. In the second position, the first bimetal disk 321 is convex and the second bimetal disk 323 is concave. Thus the central portions of the first and second bimetal disks 321 and 323 are spaced apart. In this position, the aerosol-forming substrate 30 is in fluid communication with the combustible heat source 10 via the central opening 325 of the second bimetal disk 323 and the off-centre openings 326 of the first bimetal disk 321. When a user draws on the mouthpiece 50, air is drawn into the aerosol-forming substrate 30 of the smoking article 301 through the central airflow channel 16 of the combustible heat source 10, the central opening 325 of the second bimetal disk 323 and the off-centre openings 326 of the first bimetal disk 321.

When the rate of combustion of the combustible heat source 10 reduces and its temperature falls, the heat transferred to the thermostatic bimetal valve 320 also falls. As the temperature of the thermostatic bimetal valve 320 falls to below the threshold temperature, the thermostatic bimetal valve 320 returns to the first position shown in FIG. 4A to substantially prevent air from being drawn through the smoking article 301 by the user.

The specific embodiments described above are intended to illustrate the invention. However, other embodiments may be made without departing from the spirit and scope of the invention as defined in the claims, and it is to be understood that the specific embodiments described above are not intended to be limiting.

The invention claimed is:

1. A smoking article, comprising:
   a combustible heat source having opposed front and rear faces;
   one or more airflow channels extending from the front face to the rear face of the combustible heat source;
   an aerosol-forming substrate disposed downstream of the rear face of the combustible heat source; and
   a thermostatic bimetal valve located between the rear face of the combustible heat source and the aerosol-forming substrate,
   wherein the thermostatic bimetal valve is arranged to deform from a first position, in which the valve substantially prevents or inhibits fluid communication between the one or more airflow channels and the aerosol-forming substrate, to a second position, in which the one or more airflow channels and the aerosol-forming substrate are in fluid communication, when the thermostatic bimetal valve is heated to above a threshold temperature.

2. The smoking article according to claim 1, wherein the thermostatic bimetal valve is pre-stressed such that it deforms from the first position to the second position with a snap action.

3. The smoking article according to claim 2, wherein the thermostatic bimetal valve is pre-stressed by pre-forming with a curvature of from 100 microns to 500 microns.

4. The smoking article according to claim 1, wherein the rear face of the combustible heat source is concave, and the thermostatic bimetal valve is concave in the first position and convex in the second position.

5. The smoking article according to claim 1, wherein the thermostatic bimetal valve abuts the rear face of the combustible heat source.

6. The smoking article according to claim 1, wherein the thermostatic bimetal valve comprises a first thermostatic bimetal sheet with one or more solid portions and one or more openings for allowing fluid communication between the aerosol-forming substrate and at least one of the one or more airflow channels.

7. The smoking article according to claim 6, wherein the one or more solid portions are arranged to block all of the one or more airflow channels when the thermostatic bimetal valve is in the first position and to unblock at least one of the one or more airflow channels when the thermostatic bimetal valve is in the second position.

8. The smoking article according to claim 6, wherein the thermostatic bimetal valve comprises a second thermostatic bimetal sheet adjacent to the first thermostatic bimetal sheet, the second thermostatic bimetal sheet having one or more solid portions and one or more openings for allowing fluid communication between the aerosol-forming substrate and at least one of the one or more airflow channels.

9. The smoking article according to claim 8, wherein the one or more solid portions of one or both of the first and second thermostatic bimetal sheets are arranged to block the one or more openings of the other sheet when the valve is in the first position and to unblock at least one of the one or more openings of the other sheet when the plate is in the second position.

10. The smoking article according to claim 8, wherein the first thermostatic bimetal sheet and the second thermostatic bimetal sheet are attached together along at least a portion of their peripheries.

11. The smoking article according to claim 8, wherein the second thermostatic bimetal sheet is positioned upstream of the first thermostatic bimetal sheet.

12. The smoking article according to claim 11, wherein the first thermostatic bimetal sheet comprises at least four peripheral openings and the second thermostatic bimetal sheet comprises a central hole aligned with a central airflow channel of the combustible heat source.

13. The smoking article according to claim 1, wherein the thermostatic bimetal valve has a substantially circular cross-section.

14. The smoking article according to claim 1, wherein the aerosol-forming substrate comprises a tobacco-based material and at least one aerosol former.

15. The smoking article according to claim 1, wherein the combustible heat source is a combustible carbonaceous heat source.

* * * * *